(12) United States Patent
Ladd et al.

(10) Patent No.: US 11,287,962 B2
(45) Date of Patent: *Mar. 29, 2022

(54) METHODS AND APPARATUS FOR DISPLAY ELEMENT MANAGEMENT IN AN INFORMATION NETWORK

(71) Applicant: Time Warner Cable Enterprises LLC, New York, NY (US)

(72) Inventors: Patrick Ladd, San Marcos, CA (US); Aaron James Kamienski, Des Moines, IA (US); George W. Sarosi, Niwot, CO (US); Eric B. Miller, Portland, OR (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,825

(22) Filed: Jul. 22, 2019

(65) Prior Publication Data

US 2020/0019302 A1 Jan. 16, 2020

Related U.S. Application Data

(63) Continuation of application No. 14/968,476, filed on Dec. 14, 2015, now Pat. No. 10,359,922, which is a (Continued)

(51) Int. Cl.
*G06F 3/0484* (2013.01)
*G06F 3/04847* (2022.01)
(Continued)

(52) U.S. Cl.
CPC ............ *G06F 3/04847* (2013.01); *G06F 8/70* (2013.01); *G06F 9/451* (2018.02); *G06F 21/10* (2013.01);
(Continued)

(58) Field of Classification Search
CPC .................................................. G06F 3/04847
See application file for complete search history.

(56) References Cited

U.S. PATENT DOCUMENTS 3,999,051 A 12/1976 Petschauer
4,339,657 A 7/1982 Larson et al.
(Continued)

FOREIGN PATENT DOCUMENTS

| EP | 1046259 A2 | 10/2000 |
| WO | WO-0024192 A1 | 4/2000 |
| WO | WO-0213039 A1 | 2/2002 |

OTHER PUBLICATIONS

OpenCable Application Platform Specification (copyright 2001-2003 pp. 1-398).*
(Continued)

*Primary Examiner* — Sherrod L Keaton
(74) *Attorney, Agent, or Firm* — Gazdzinski & Associates, PC

(57) ABSTRACT

Methods and apparatus for managing display elements such as GUI windows in a client device (e.g., consumer premises equipment in a cable network) running multiple related or unrelated applications. In one embodiment, an improved window management entity is provided within the device with which HAVi-compliant application(s) can interface in order to access display elements according to a priority structure or hierarchy. One or more privileged applications are designated and allowed to affect the priority structure, including requesting a new in-focus application to be placed atop the priority structure. The network operator can also optionally control the operation of the window manager remotely via a network agent. Improved client device and network configurations, as well as methods of operating these systems, are also disclosed.

21 Claims, 11 Drawing Sheets

Related U.S. Application Data continuation of application No. 10/773,664, filed on Feb. 6, 2004, now Pat. No. 9,213,538.

(51) Int. Cl.
    *G06F 8/70*         (2018.01)
    *G06F 9/451*       (2018.01)
    *G06F 21/10*      (2013.01)
    *H04N 21/431*     (2011.01)
    *H04N 21/00*      (2011.01)
    *G06F 21/60*      (2013.01)

(52) U.S. Cl.
    CPC ........... *H04N 21/00* (2013.01); *H04N 21/431* (2013.01); *G06F 21/60* (2013.01); *G06F 2221/032* (2013.01)

(56) References Cited

U.S. PATENT DOCUMENTS

| | | | |
|---|---|---|---|
| 4,574,364 A | 3/1986 | Tabata et al. | |
| 4,604,751 A | 8/1986 | Aichelmann, Jr. et al. | |
| 4,692,757 A | 9/1987 | Tsuhara et al. | |
| 4,710,761 A | 12/1987 | Kapur et al. | |
| 4,845,644 A | 7/1989 | Anthias et al. | |
| 4,890,098 A | 12/1989 | Dawes et al. | |
| 4,890,257 A | 12/1989 | Anthias et al. | |
| 5,113,517 A | 5/1992 | Beard et al. | |
| 5,121,475 A | 6/1992 | Child et al. | |
| 5,129,055 A | 7/1992 | Yamazaki et al. | |
| 5,155,731 A | 10/1992 | Yamaguchi | |
| 5,175,813 A | 12/1992 | Golding et al. | |
| 5,245,615 A | 9/1993 | Treu | |
| 5,276,437 A | 1/1994 | Horvath et al. | |
| 5,408,602 A | 4/1995 | Giokas et al. | |
| 5,463,768 A | 10/1995 | Cuddihy et al. | |
| 5,487,143 A | 1/1996 | Southgate | |
| 5,502,839 A | 3/1996 | Kolnick | |
| 5,522,025 A | 5/1996 | Rosenstein | |
| 5,564,002 A | 10/1996 | Brown | |
| 5,581,686 A | 12/1996 | Koppolu et al. | |
| 5,596,702 A | 1/1997 | Stucka et al. | |
| 5,621,879 A | 4/1997 | Kohda | |
| 5,664,046 A | 9/1997 | Abecassis | |
| 5,673,403 A | 9/1997 | Brown et al. | |
| 5,675,755 A | 10/1997 | Trueblood | |
| 5,692,142 A | 11/1997 | Craycroft et al. | |
| 5,734,380 A | 3/1998 | Adams et al. | |
| 5,764,230 A | 6/1998 | Baradel et al. | |
| 5,790,779 A | 8/1998 | Ben-Natan Or et al. | |
| 5,831,609 A | 11/1998 | London et al. | |
| 5,850,544 A | 12/1998 | Parvathaneny et al. | |
| 5,856,826 A | 1/1999 | Craycroft | |
| 5,862,316 A | 1/1999 | Hagersten et al. | |
| 5,867,160 A | 2/1999 | Kraft, IV et al. | |
| 5,874,960 A | 2/1999 | Mairs et al. | |
| 5,877,755 A | 3/1999 | Hellhake | |
| 5,895,472 A | 4/1999 | Brodsky et al. | |
| 5,973,702 A | 10/1999 | Orton et al. | |
| 5,995,103 A | 11/1999 | Ashe | |
| 6,031,530 A * | 2/2000 | Trueblood | G06F 3/0481 |
| | | | 715/791 |
| 6,049,827 A * | 4/2000 | Sugauchi | H04L 41/22 |
| | | | 709/219 |
| 6,092,107 A | 7/2000 | Eleftheriadis et al. | |
| 6,160,872 A | 12/2000 | Karnowski et al. | |
| 6,169,725 B1 | 1/2001 | Gibbs et al. | |
| 6,181,713 B1 | 1/2001 | Patki et al. | |
| 6,192,403 B1 | 2/2001 | Jong et al. | |
| 6,216,152 B1 | 4/2001 | Wong et al. | |
| 6,219,044 B1 | 4/2001 | Ansberry et al. | |
| 6,233,611 B1 | 5/2001 | Ludtke et al. | |
| 6,240,555 B1 * | 5/2001 | Shoff | H04N 5/44591 |
| | | | 725/110 |
| 6,252,889 B1 | 6/2001 | Patki et al. | |
| 6,313,880 B1 | 11/2001 | Smyers et al. | |
| 6,317,881 B1 | 11/2001 | Shah-Nazaroff et al. | |
| 6,330,010 B1 | 12/2001 | Nason et al. | |
| 6,336,122 B1 | 1/2002 | Lee et al. | |
| 6,337,717 B1 | 1/2002 | Nason et al. | |
| 6,366,876 B1 | 4/2002 | Looney | |
| 6,381,710 B1 | 4/2002 | Kim | |
| 6,381,735 B1 | 4/2002 | Hunt | |
| 6,397,262 B1 | 5/2002 | Hayden et al. | |
| 6,430,570 B1 | 8/2002 | Judge et al. | |
| 6,456,892 B1 | 9/2002 | Dara-Abrams et al. | |
| 6,460,141 B1 | 10/2002 | Olden | |
| 6,469,742 B1 | 10/2002 | Trovato, I et al. | |
| 6,496,864 B1 | 12/2002 | McCartney | |
| 6,505,298 B1 | 1/2003 | Cerbini et al. | |
| 6,510,152 B1 | 1/2003 | Gerszberg et al. | |
| 6,529,965 B1 | 3/2003 | Thomsen et al. | |
| 6,532,552 B1 | 3/2003 | Benignus et al. | |
| 6,542,500 B1 | 4/2003 | Gerszberg et al. | |
| 6,546,016 B1 | 4/2003 | Gerszberg et al. | |
| 6,546,419 B1 | 4/2003 | Humpleman et al. | |
| 6,600,958 B1 | 7/2003 | Zondag | |
| 6,606,711 B2 | 8/2003 | Andrews et al. | |
| 6,625,274 B1 | 9/2003 | Hoffpauir et al. | |
| 6,630,943 B1 | 10/2003 | Nason et al. | |
| 6,631,350 B1 | 10/2003 | Celi, Jr. et al. | |
| 6,631,403 B1 | 10/2003 | Deutsch et al. | |
| 6,651,248 B1 | 11/2003 | Alpern | |
| 6,654,722 B1 | 11/2003 | Aldous et al. | |
| 6,687,735 B1 | 2/2004 | Logston et al. | |
| 6,714,534 B1 | 3/2004 | Gerszberg et al. | |
| 6,750,879 B2 | 6/2004 | Sandberg | |
| 6,762,796 B1 | 7/2004 | Nakajoh et al. | |
| 6,762,798 B1 | 7/2004 | Messer et al. | |
| 6,802,056 B1 | 10/2004 | Chaiken et al. | |
| 6,847,649 B2 | 1/2005 | Sutanto | |
| 6,850,533 B2 | 2/2005 | Gerszberg et al. | |
| 6,856,330 B1 | 2/2005 | Chew et al. | |
| 6,873,877 B1 | 3/2005 | Tobias et al. | |
| 6,895,573 B2 | 5/2005 | Norgaard et al. | |
| 6,938,254 B1 | 8/2005 | Mathur et al. | |
| 6,941,341 B2 | 9/2005 | Logston et al. | |
| 6,944,185 B2 | 9/2005 | Patki et al. | |
| 6,948,175 B1 | 9/2005 | Fong et al. | |
| 6,948,183 B1 | 9/2005 | Peterka | |
| 6,952,836 B1 | 10/2005 | Donlan et al. | |
| 6,968,364 B1 | 11/2005 | Wong et al. | |
| 6,973,050 B2 | 12/2005 | Birdwell et al. | |
| 6,996,808 B1 | 2/2006 | Niewiadomski et al. | |
| 7,010,796 B1 | 3/2006 | Strom et al. | |
| 7,039,633 B1 | 5/2006 | Dey et al. | |
| 7,055,146 B1 | 5/2006 | Durr et al. | |
| 7,058,964 B2 * | 6/2006 | Khandelwal | H04N 7/163 |
| | | | 348/E7.056 |
| 7,068,597 B1 | 6/2006 | Fijolek et al. | |
| 7,080,356 B2 | 7/2006 | Atallah et al. | |
| 7,096,459 B2 | 8/2006 | Keller et al. | |
| 7,111,072 B1 | 9/2006 | Matthews et al. | |
| 7,137,106 B2 | 11/2006 | Herman et al. | |
| 7,146,305 B2 | 12/2006 | Made et al. | |
| 7,158,993 B1 | 1/2007 | Schwabe | |
| 7,181,725 B1 | 2/2007 | Posegga et al. | |
| 7,194,249 B2 | 3/2007 | Phillips et al. | |
| 7,203,869 B2 | 4/2007 | Gwak | |
| 7,213,213 B2 | 5/2007 | Sekiguchi et al. | |
| 7,216,170 B2 | 5/2007 | Ludvig et al. | |
| 7,240,104 B2 | 7/2007 | Gautney | |
| 7,266,726 B1 | 9/2007 | Ladd et al. | |
| 7,290,253 B1 | 10/2007 | Agesen | |
| 7,316,003 B1 | 1/2008 | Dulepet et al. | |
| 7,328,333 B2 | 2/2008 | Kawano et al. | |
| 7,370,322 B2 | 5/2008 | Matena et al. | |
| 7,394,473 B2 | 7/2008 | Asai | |
| 7,401,324 B1 | 7/2008 | Dmitriev | |
| 7,478,341 B2 | 1/2009 | Dove | |
| 7,487,534 B1 | 2/2009 | Peterka et al. | |
| 7,546,602 B2 | 6/2009 | Hejlsberg et al. | |
| 7,552,450 B1 | 6/2009 | Evans et al. | |
| 7,698,606 B2 | 4/2010 | Ladd et al. | |

(56) References Cited

U.S. PATENT DOCUMENTS

| | | |
|---|---|---|
| 7,814,544 B1 | 10/2010 | Wilhelm |
| 7,945,902 B1 | 5/2011 | Sahoo |
| 8,024,607 B2 | 9/2011 | Ladd et al. |
| 8,042,113 B2 | 10/2011 | Clohessy et al. |
| 8,046,636 B2 | 10/2011 | Ladd et al. |
| 8,302,111 B2 | 10/2012 | Ladd et al. |
| 8,321,723 B2 | 11/2012 | Ladd et al. |
| 8,799,723 B2 | 8/2014 | Ladd et al. |
| 2001/0007138 A1 | 7/2001 | Iida et al. |
| 2001/0049691 A1 | 12/2001 | Asazu |
| 2002/0009149 A1 | 1/2002 | Rodriguez et al. |
| 2002/0032754 A1 | 3/2002 | Logston et al. |
| 2002/0034193 A1 | 3/2002 | Patki et al. |
| 2002/0038358 A1 | 3/2002 | Sweatt et al. |
| 2002/0040470 A1 | 4/2002 | Guthrie et al. |
| 2002/0044567 A1 | 4/2002 | Voit et al. |
| 2002/0044569 A1 | 4/2002 | Kwok et al. |
| 2002/0049978 A1 | 4/2002 | Rodriguez et al. |
| 2002/0052977 A1 | 5/2002 | Stall |
| 2002/0073244 A1 | 6/2002 | Davies et al. |
| 2002/0083214 A1 | 6/2002 | Heisig et al. |
| 2002/0112090 A1 | 8/2002 | Bennett et al. |
| 2002/0122656 A1 | 9/2002 | Gates |
| 2002/0126144 A1 | 9/2002 | Chenede |
| 2002/0144193 A1 | 10/2002 | Hicks et al. |
| 2002/0170033 A1 | 11/2002 | Chen |
| 2002/0174430 A1 | 11/2002 | Ellis et al. |
| 2002/0174433 A1 | 11/2002 | Baumgartner et al. |
| 2002/0191028 A1 | 12/2002 | Senechalle et al. |
| 2002/0198868 A1 | 12/2002 | Kinzhalin, I et al. |
| 2003/0005454 A1 | 1/2003 | Rodriguez et al. |
| 2003/0009567 A1 | 1/2003 | Farouk |
| 2003/0009765 A1 | 1/2003 | Linden et al. |
| 2003/0009769 A1 | 1/2003 | Hensgen et al. |
| 2003/0037331 A1 | 2/2003 | Lee |
| 2003/0041291 A1 | 2/2003 | Hashem et al. |
| 2003/0056155 A1 | 3/2003 | Austen et al. |
| 2003/0056217 A1 | 3/2003 | Brooks |
| 2003/0061240 A1 | 3/2003 | McCann et al. |
| 2003/0081664 A1 | 5/2003 | Lu et al. |
| 2003/0105995 A1 | 6/2003 | Schroath et al. |
| 2003/0107604 A1 | 6/2003 | Ording |
| 2003/0110331 A1 | 6/2003 | Kawano et al. |
| 2003/0110511 A1 | 6/2003 | Schutte et al. |
| 2003/0121054 A1 | 6/2003 | Lorenz |
| 2003/0121055 A1 | 6/2003 | Kaminski et al. |
| 2003/0122879 A1 | 7/2003 | Inui et al. |
| 2003/0140285 A1 | 7/2003 | Wilkie |
| 2003/0163811 A1 | 8/2003 | Luehrs |
| 2003/0181241 A1 | 9/2003 | Oakes et al. |
| 2003/0188320 A1 | 10/2003 | Shing |
| 2003/0204848 A1 | 10/2003 | Cheng et al. |
| 2003/0217197 A1 | 11/2003 | Chan et al. |
| 2003/0217365 A1 | 11/2003 | Caputo |
| 2003/0229899 A1 | 12/2003 | Thompson et al. |
| 2003/0229900 A1* | 12/2003 | Reisman .......... H04N 21/42204 725/87 |
| 2003/0231855 A1 | 12/2003 | Gates et al. |
| 2004/0003400 A1 | 1/2004 | Carney et al. |
| 2004/0030997 A1* | 2/2004 | Farrah .................. G06F 40/186 715/255 |
| 2004/0034697 A1 | 2/2004 | Fairhurst et al. |
| 2004/0040041 A1 | 2/2004 | Crawford |
| 2004/0073944 A1 | 4/2004 | Booth |
| 2004/0078695 A1 | 4/2004 | Bowers et al. |
| 2004/0078829 A1 | 4/2004 | Patel et al. |
| 2004/0083464 A1 | 4/2004 | Cwalina et al. |
| 2004/0098730 A1 | 5/2004 | Foote et al. |
| 2004/0103434 A1 | 5/2004 | Ellis |
| 2004/0107451 A1 | 6/2004 | Khandelwal et al. |
| 2004/0130540 A1* | 7/2004 | Sekiguchi .............. G09G 5/001 345/204 |
| 2004/0143836 A1 | 7/2004 | McCormack et al. |
| 2004/0158829 A1 | 8/2004 | Beresin et al. |
| 2004/0181811 A1 | 9/2004 | Rakib |
| 2004/0186603 A1 | 9/2004 | Sanford et al. |
| 2004/0187152 A1 | 9/2004 | Francis et al. |
| 2004/0199903 A1 | 10/2004 | Iizuka |
| 2004/0205339 A1 | 10/2004 | Medin |
| 2004/0218736 A1 | 11/2004 | Fang et al. |
| 2004/0236759 A1 | 11/2004 | Young |
| 2004/0261092 A1 | 12/2004 | Addington et al. |
| 2004/0261114 A1 | 12/2004 | Addington et al. |
| 2004/0261116 A1 | 12/2004 | McKeown et al. |
| 2004/0261126 A1 | 12/2004 | Addington et al. |
| 2005/0015799 A1 | 1/2005 | Park |
| 2005/0021766 A1 | 1/2005 | McKeowen et al. |
| 2005/0027715 A1 | 2/2005 | Casey |
| 2005/0027851 A1 | 2/2005 | McKeown et al. |
| 2005/0071818 A1 | 3/2005 | Reissman et al. |
| 2005/0114900 A1 | 5/2005 | Ladd et al. |
| 2005/0120385 A1 | 6/2005 | Stalker |
| 2005/0132346 A1 | 6/2005 | Tsantilis |
| 2005/0160045 A1 | 7/2005 | Watanabe et al. |
| 2005/0177832 A1 | 8/2005 | Chew |
| 2005/0273762 A1 | 12/2005 | Lesh |
| 2006/0005183 A1 | 1/2006 | Minear et al. |
| 2006/0020950 A1 | 1/2006 | Ladd et al. |
| 2006/0036750 A1 | 2/2006 | Ladd et al. |
| 2006/0047957 A1 | 3/2006 | Helms et al. |
| 2006/0070051 A1 | 3/2006 | Kuck et al. |
| 2006/0129947 A1 | 6/2006 | Hamzy et al. |
| 2006/0130107 A1 | 6/2006 | Gonder et al. |
| 2006/0130113 A1 | 6/2006 | Carlucci et al. |
| 2006/0143492 A1 | 6/2006 | Leduc et al. |
| 2007/0094345 A1 | 4/2007 | Rabbers et al. |
| 2007/0217436 A1 | 9/2007 | Markley et al. |
| 2007/0261090 A1 | 11/2007 | Miller et al. |
| 2007/0288897 A1 | 12/2007 | Branda et al. |
| 2007/0294673 A1 | 12/2007 | Guerrera et al. |
| 2008/0098212 A1 | 4/2008 | Helms et al. |
| 2008/0178153 A1 | 7/2008 | Fox et al. |
| 2008/0196011 A1 | 8/2008 | Bhandari et al. |
| 2008/0256510 A1 | 10/2008 | Auerbach |
| 2008/0288930 A1 | 11/2008 | Chen et al. |
| 2009/0222867 A1 | 9/2009 | Munetsugu |
| 2013/0247027 A1 | 9/2013 | Shah et al. |

OTHER PUBLICATIONS

OpenCable Application Platform Specification (© 2001-2003 pp. 1-398).*

"JMFRegistry User's Guide", Sun Microsystems, XP-002573305, Mar. 8, 2010.

Allen, et al., The Case for Run-Time Types in Generic Java, Rice University 2002 pp. 1-6.

Chapter 16—Window Management. Xlib Programming Manual, No Date. 38 pages.

Chapter 4—Window Manager for Mac ©. Apple Computer. Inc., Jul. 11, 1996, 4 pages.

Chapter 7—Window Management, SOL library Documentation vU.3-rev 1, Sep. 2001, 2 pages.

Chou, et al.,Open CPE Architecture: A Solution to the Delivery of Integrated Services over Broadband, Intel Communication Group, Corp. pp. 1-10, 2001.

Curran, et al., 8th IEEE International Conference on Communication Systems Singapore, Nov. 25-28, 2002 The Use of Dynamically Reconfigurable Protocol Stacks for Streaming Multimedia to Mobile Devices, http://www.infm.ulst.ac.uk/.about.kevin/pubs.htm.

Day, "Java Media Framework Player API", Apr. 1997, XP-002093309, www.javaworld.com.

Eldering, Charles, Customer Permises Epuipment Residential Broadband Networks, Jun. 1997, IEEE, p. 114-212.

Ellis, "Getting to Know the OpenCable Application Platform," Sun microsystems, Jun. 2006.

Evain, "The Multimedia Home Platform" EBU Review—Technical, European Broadcasting Union. Brussels, BE, No. 275, Mar. 21, 1998, pp. 4-10, XP000767493.

Han, et al., Websplitter copyright 2000.

Hentschel et al., Video Quality Of Service For Consumer Terminal A Novel System For Programmable Componets, 2002, IEEE, pp. 28-29.

(56) References Cited

OTHER PUBLICATIONS

Hutchings, et al., New Operation for Display Space Management and Window Management Technical Report GIT-GVU-02-18, Aug. 2002, College of Computing/GVU Center. 20 pages.

Hutchings, et al., "Display Space Usage and Window Management Operation Comparison between Single Monitor and Multiple Monitor Users" nodate. 8 pages.

Java Media Players, V.1.0.5, May 5, 1998, X940410443, Sun Microsystems, Inc.

Kar, et al., Cable's Home Digital Network Interface Of Choice, 1999, Cable Television Lab. IEEE, pp. 34-35.

Luu, MainWin and Window Managers for Mainsoft © Sep. 27, 2000, 5 pages.

Mayer, "Analyzing the Use of Interfaces in Large OO Projects," ACM, Oct. 2003.

Motorola Product Detail, HFC Manager HFC Element Management System; 1 page: © Motorola, Inc. 2004; www.motorola.com/lbroadband.

Motorola, Control Management Module (CMM 2000) information sheets: 4 pages; C Motorola, Inc. 2001; www.motorola.comfbroadband.

Motorola, HFC Manager, Integrated Element Management System information sheets; 4 pages; .COPYRGT. Motorola, Inc. 2003; www.motorola.com/broadband.

Motorola—DCT2000 Digital Consumer Terminal Installation Manual; 70 pgs.

Motorola—DCT5100 Digital Consumer Terminal Installation Manual; 81 pgs.

OCAP Applications in Detail (pp. 1-8), www.tvwithoutborders.com, Feb. 13, 2010.

OpenCable Application Platform Specification ("OpenCable" copyright 2001-2003 pp. 1-398).

OpenCable Application Platform Specification OC-SP-OCAP1.0-IF-I09-031121.

OpenCable Host Device, Core Functional Requirements, Issued Specification (OC-SP-HOST-CFR-114-030905), Sep. 5, 2003, 81 pages.

Scientific Atlanta Company Overview web pages, 3 pages, no date http://www.scientificatlanta.com/newscentedifrarne.sub.--companyoverview.- htm.

Scientific Atlanta, Recognize, Trouble-Shoot, Correct information sheet; 1 page; no date; www.scientificatlanta.com.

Scientific Atlanta, ROSA Network Management System and Element Management web pages, 10 pages, © Scientific Atlanta 2006, www.scientiicatlanta.com.

Scientific Atlanta, Subscriber Networks; Explorer.RTM. 3100HD High Definition DHCT information pages; Oct. 2001; 2 pgs.

Scientific Atlanta, Subscriber Networks; Explorer.RTM. 4200 Home Gateway information pages; Sep. 2003; 3 pgs.

Scientific Atlanta, Subscriber Products; Explorer.RTM. 8000.TM. Home Entertainment Server information pages; Nov. 2003; 4 pgs.

Tan, et al., WinCuts: Manipulating Arbitrary Window Regions for More Effective Use of Screen Space• Microsoft Research. No Date. 4 pages.

Xie, et al., "MAPO: Mining API Usages from Open Source Repositories," ACM, May 2006.

\* cited by examiner

METHODS AND APPARATUS FOR DISPLAY ELEMENT MANAGEMENT IN AN INFORMATION NETWORK

PRIORITY

This application is a continuation of and claims priority to co-owned and co-pending U.S. patent application Ser. No. 14/968,476 of the same title filed on Dec. 14, 2015, and issuing as U.S. Pat. No. 10,359,922, which is a continuation of and claims priority to co-owned U.S. patent application Ser. No. 10/773,664 of the same title filed on Feb. 6, 2004, issued as U.S. Pat. No. 9,213,538 on Dec. 15, 2015, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of software applications used on an information network (such as a cable television network), and specifically to the management and control of windows or other user display elements between multiple applications.

2. Description of Related Technology

Software applications are well known in the prior art. Such applications may run on literally any type of electronic device, and may be distributed across two or more locations or devices connected by a network. Often, a so-called "client/server" architecture is employed, where one or more portions of applications disposed on client or consumer premises devices (e.g., PCs, PDAs, digital set-top boxes {DSTBs}, hand-held computers, etc.) are operatively coupled and in communication with other (server) portions of the application. Such is the case in the typical hybrid fiber coax (HFC) or satellite content network, wherein consumer premises equipment or CPE (e.g., DSTBs or satellite receivers) utilize the aforementioned "client" portions of applications to communicate with their parent server portions in order to provide downstream and upstream communications and data/content transfer.

Digital TV (DTV) is an emerging technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including HFC, satellite, wireless, or terrestrial. DTV standards such as the OpenCable Application Platform middleware specification (e.g., Version 1.0, and incipient Version 2.0) require that applications be downloaded to CPE from the bearer or broadcast network in real-time. The OCAP specification is a middleware software layer specification intended to enable the developers of interactive television services and applications to design such products so that they will run successfully on any cable television system in North America, independent of set-top or television receiver hardware or operating system software choices.

A recently proposed Home Audio Video Interoperability (HAVi) standard is a consumer electronics (CE) industry standard designed to permit conforming digital audio and video devices, regardless of manufacturer, to interoperate when connected via a network in the consumer's home. The HAVi standard uses the digital IEEE-1394 network standard for data transfer between devices and the 1394 A/VC protocols for device control.

The HAVi standard focuses on the transfer and processing (for example, recording and playback) of digital content between networked devices. HAVi-compliant devices will include not only familiar audio and video components but also cable modems, digital set-top boxes and "smart" storage devices such as personal video recorders (PVRs). In the future, other kinds of devices such as videophones and personal digital assistants (PDAs) also may become part of a HAVi home network. By letting a TV set, or any other device on the network that has a display capability, act as a network hub to both control and show the status of any connected device, compliance with the HAVi standard will make consumer electronic equipment easier to use. In a HAVi-compliant system, all of the networked components can be run from the TV with one remote control. A home PC will not be required for a HAVi-compliant system to operate, such system being independent of any operating system or microprocessor. However, a PC can act as a HAVi-compliant device, with the ability to control other connected devices.

Compliance with the HAVi standard also allows disparate brand devices to be hooked into a home network. A DV camcorder, video game player or even a refrigerator conforming to the HAVi standard could be plugged into a network and have its features automatically available for use by other devices on the network. From the consumer's perspective, all that is required is to select a task for a device and the HAVi host will order the task performed.

By employing modular software, the HAVi standard allows consumer electronics devices to identify themselves and what they can do when plugged into the host. The software functions by assigning a device control ID module to each hardware component of a system. Each system also is assigned multiple functional component modules, containing information about an individual device's capabilities, for example, whether a camcorder operates in DV format, or whether a receiver is designed to process AC3 audio.

HAVi-compliant devices automatically register their operating status, device functions and location with other components in the network. So when a host device recognizes a new component on a HAVi system, the host loads the appropriate device and functional modules, allowing users to control the target device from the host.

Despite the foregoing, the features promised by the HAVi standard will only be available for HAVi-compliant devices. Further, the HAVi standard anticipates that the graphical user interface of the network of components is displayed on a television or other video display component of the system, thus requiring the video display component to be powered on when using a system device. If a user desires to use only the audio components of a system the video display must still be powered on.

The user interface (UI) aspects of HAVi were adopted by several relevant and well known standards including OCAP, MHP, ACAP, and GEM. However, in the context of multiple unrelated applications running concurrently (and each possibly displaying one or more windows), the current OCAP graphics reference model imposes unwanted constraints. For example, when running a ticker application, OCAP provides no mechanism to guarantee that the ticker window is not overlaid by another application's window. It is also recognized that the MHP Standard from which OCAP is derived (i.e., Version 1.0.2) only runs applications that are associated; i.e., delivered in the same service and programmed to work together. This, however, is not the case with OCAP, which extends MHP to allow other types of applications not associated with applications in a particular service to run concurrently with any other applications. This heterogeneous application capability of OCAP can accordingly create many different mixtures of different applications each with different windowing requirements and capabilities.

HAVi states that any system using HAVi should define a "home navigation shell" if any window management rules beyond the base HAVi definition are needed. HAVi specifies z-ordering and other window management aspects within an application, but does not address cross-application window management.

In addition to the HAVi approach described above, a variety of other approaches to application window management and handling within computer and network systems in general are taught in the prior art.

For example, U.S. Pat. No. 4,845,644 to Anthias, et al. issued Jul. 4, 1989 and entitled "Data display system" discloses a data display system in which input-output display devices are connected to a central processor, and users select application programs that are run on the central processor. The control system of the central processor includes a display manager control system and a windowing control mechanism which allows a plurality of tasks to be performed concurrently and the results displayed in areas of a display screen. The windowing control mechanism includes, a task manager control program which runs as an application in the display manager control system and includes means to interact, via the display manager, with the operator to allow applications to be initiated, means to create tasks to control the processing of the application in such a way that the applications can be suspended or resumed according to whether the operator is ready for them, and means to identify to the display manager a coordination controller that the display manager can call to allow the task manager to suspend and resume applications. The display manager includes, means to combine data from each application and build a display representation that shows many windows into the various applications onto a single screen, and means to call the coordination controller identified by the task management application so that the task manager can suspend applications that are waiting for input and resume those applications which have input available.

U.S. Pat. No. 4,890,098 to Dawes, et al. issued Dec. 26, 1989 and entitled "Flexible window management on a computer display" discloses a technique for managing windows in a display system. The window manager allows a user to mark an area on the display to define the dimensions and contents of a resized window. All non-hidden text and attributes within the enclosed area are incorporated into the resized window; however, the original windows do not lose their original characteristics. The marked area may span multiple windows, so multiple windows may be incorporated into the newly resized window. For each position within the newly resized window, a check is made for a window below. If no window exists below this position, the default, or background, character and attribute are incorporated into the newly resized window. If there exists a window below, a determination is made as to whether the window below is visible or hidden. If hidden, the system continues to look for a visible window until no further window is found below, at which point the default character and attribute are incorporated into the newly resized window. When a visible window is found below the newly resized window, the character and attribute from its corresponding position are read and incorporated into the newly resized window. This process continues until all of the information is processed from the marked area. In this manner, a window can be enlarged to incorporate the contents of several windows by enclosing several windows in the marked area.

U.S. Pat. No. 5,113,517 to Beard, et al. issued May 12, 1992 and entitled "Concurrent display of data from two different processors each having different display font and user interface for controlling transfer of converted font data therebetween" discloses a multiprocessor system comprising concurrent display of video data reflecting the operation of two processors in discrete portions of a single display screen with a user interface adapted for interaction with both processors. One processor controls the entire display while allocating a portion of the display screen for the use of the other processor which processor emulates a target processor system, for example, the IBM PC. A user interface is represented on the display screen in the form of metaphoric objects, called icons, with which the user can interact by changing the input focus to a designated object by visually pointed to it via the input means, which thereafter permits manipulation of the designated object of interaction with data input/output relative to the designated object. This input means is also used to initially change the input focus to either the allocated emulating processor screen portion or to the remaining portion of the central processor display screen prior to interaction with the metaphoric objects in a selected screen portion, the change of the input focus causing subsequent user input via the input means to be directed to the selected screen portion until interrupted by a change in focus input to the other of the screen portions by the user via the input means. Facilities are also provided to permit transferring of displayed data reflecting the operation of one processor to the control of the other processor in response to user inputs selecting the data to be transferred and indicating the destination of the selected data on the display.

U.S. Pat. No. 5,175,813 to Golding, et al. issued Dec. 29, 1992 and entitled "Window display system and method for creating multiple scrollable and non-scrollable display regions on a non-programmable computer terminal" discloses a windowing system with interface between application programs and non-programmable terminal drivers. The system presents logical windows to the applications program, each of which are represented internally by at least two separate parts. The first part includes the border and non-scrollable text for a logical window, while the second part includes scrollable text for the window. Through calls to the display driver, the windowing system manipulates these separate parts so that they are displayed on the screen as a single window.

U.S. Pat. No. 5,276,437 to Horvath, et al. issued Jan. 4, 1994 and entitled "Multi-media window manager" discloses an apparatus and method for displaying non-obscured pixels in a multiple-media motion video environment (dynamic image management) possessing overlaid windows. In an encoding process, only boundary values and identification values corresponding to each window on a screen are saved in memory of a hardware device. In a decoding process, the hardware device utilizes these initial boundary values saved in memory in such a way that when incoming video data enters the hardware device, the hardware device need only compare the incoming video data's identification with the identification saved in memory. The hardware device includes: compare logic devices, counters, minimal memory devices, a control logic block, and a driver.

U.S. Pat. No. 5,408,602 to Giokas, et al. issued Apr. 18, 1995 and entitled "System and method for emulating a window management environment having a uniform windowing interface" discloses an X window display server providing a virtual window manager client that, from the viewpoint of client programs connected to the server, is indistinguishable from a real window manager client. The emulated window manager is implemented as an internal server client.

U.S. Pat. No. 5,502,839 to Kolnick issued Mar. 26, 1996 and entitled "Object-oriented software architecture supporting input/output device independence" discloses an object-oriented software architecture that interacts with "real" input/output devices exclusively through "virtual" input/output devices. Since all human interface with the operating system is performed through such virtual devices, the system can accept different forms of real input or output devices. The lowest level of the operating system converts input from a physical device to virtual form and converts virtual output into suitable physical output. A number of physical devices can be connected to, removed from, or replaced in the system without disrupting the system.

U.S. Pat. No. 5,522,025 to Rosenstein issued May 28, 1996 and entitled "Object-oriented window area display system" discloses an object-oriented window manager providing coordination between window displays generated by separate application programs by computing and storing the visible area of each application window each time displayed windows are changed. Each application program directly communicates with the screen buffer memory in order to redraw portions of the screen corresponding to its display area using the visible area computed by the window manager. Each application program communicates with the object-oriented window manager by creating a window object which provides display capabilities that are transparent to the application program. Several techniques are used to decrease the visible area computation time. First, a copy of the visible area is stored or "cached" in each window object. This copy can be used if the application program needs to redraw the window area and the visible area has not been changed. In addition, the window manager computes the visible area of each application window utilizing a routine that assumes that only a single window has been changed and compares the new visible area of the window to the old visible area to obtain the change area. This change area is then used to recompute the visible area of all windows which lie behind the changed window.

U.S. Pat. No. 5,564,002 to Brown issued Oct. 8, 1996 and entitled "Method and apparatus for implementing a virtual desktop through window positioning" discloses a virtual desktop system that organizes open applications of a computer into groups of programs that perform common functions or tasks. The groups of programs are called Desktops and the virtual desktop system provides a Desktop Manager for assigning ranges of display screen coordinates to these Desktops, and then assigning open applications to them. Specifically, the Desktop Manager is a system software program that contains a plurality of Desktop groups and that provides a user interface for managing the display of selected open applications assigned to the Desktops. These selected open applications are displayed in application windows on a display screen of the computer when switching between Desktops in the virtual desktop system.

U.S. Pat. No. 5,581,686 to Koppolu, et al. issued Dec. 3, 1996 and entitled "Method and system for in-place interaction with contained objects" discloses a computer method and system for interacting with a containee object contained within a container object. The container object has a container application with a container window environment that has container resources for interacting with the container object. The containee object has a server application with a server window environment with server resources for interacting with the containee object. The invention displays the container window environment on a display device. A user then selects the containee object. In response to selecting the containee object, the system integrates a plurality of the server resources with the displayed container window environment. When a user then selects a server resource, the server application is used to process the server resource selection. Conversely, when a user selects a container resource, the container application is used to process the container resource selection.

U.S. Pat. No. 5,621,879 to Kohda issued Apr. 15, 1997 and entitled "Window management information input/output system" discloses a data processing unit capable of displaying a window on the display screen, ostensibly to refer to and update window management information, that is, information indicating the size and the position of the window, etc. in a representation format comprehensible for a user. It comprises (i) a window selecting unit for selecting a window corresponding to the window management information to be accessed by the user, (ii) a window-management-information-providing unit for inputting to and outputting from the display the management information in the format comprehensible for the user, (iii) a window-management-information-reading unit for reading the management information for the selected window from the window system, converting the representation format of the information, and outputting the result to the window-management-information-providing unit, and (iv) a window-management-information-writing unit for converting the management information converted on the display screen using, for example, a keyboard, and outputted by the window-management-information-providing unit back to the original representation format, and for outputting the result to the window system.

U.S. Pat. No. 5,692,142 to Craycroft, et al. issued Nov. 25, 1997 and entitled "Support for custom user-interaction elements in a graphical, event driven computer system" discloses a system whereby support for so-called "custom gadgets" is provided, at a system software level, in a manner that is essentially application-transparent. Specific support is provided for the addition of one custom gadget per window. The custom gadget is identified by a specific numeric code in the same manner as the close and zoom boxes. An application tells the system software what the custom gadget for a particular window should look like. The code responsible for drawing that window's frame then knows where to find the image of the custom gadget and will render it appropriately. When a user clicks in the custom gadget, the system software notifies the application of the event by means of the numeric code associated with the custom gadget.

U.S. Pat. No. 5,764,230 to Baradel, et al. issued Jun. 9, 1998 and entitled "Window manager suitable for multiple window workstations" discloses a window manager for a windowing system including a window server to command the display on screen of first windows reserved by client programs of the system. The window manager manages the disposition and the circulation of first windows within a second window reserved by the system. The server holds in memory a tree structure of windowing data on the basis of which the window server communicates with the screen window manager and with the client programs. This structure has a root defining the second window and nodes defining corresponding first windows. The window manager manages in the root a first list of identifiers of first windows and detects in each node the presence or the absence of control data. If control data is present in a node defining a particular first window, the window manager manages the disposition and the circulation of the first windows on the basis of second window data under the control of a client program.

U.S. Pat. No. 5,831,609 to London, et al. issued Nov. 3, 1998 and entitled "Method and system for dynamic translation between different graphical user interface systems" discloses a translation software that provides remote access to an application program that is executing on a host machine in its native operating system environment. The translation software monitors messages that are relayed from the application program to an application interface that is provided via the native operating system. Upon recognizing a message that affects a graphical user interface of the native operating system, the translation software converts the message into a protocol that is recognized by a remote graphical user interface. By monitoring and converting messages in this fashion, the translation software allows the application program to be displayed remotely.

U.S. Pat. No. 5,856,826 to Craycroft issued Jan. 5, 1999 and entitled "Method and apparatus for organizing window groups and windows in a table" discloses a method and apparatus for organizing windows to be displayed on a screen of a computer system into window groups by attribute, function, content, or any arbitrary characteristic. A window's membership in a window group is also assigned a status that determines whether the window, upon selection, is displayed individually or as part of that group. Each window may simultaneously belong to a plurality of window groups. A data structure may be formed in a table where windows represent rows and window groups represent columns.

U.S. Pat. No. 5,867,160 to Kraft, I V, et al. issued Feb. 2, 1999 and entitled "System and method for task prioritization in computerized graphic interface environments" discloses a system and method for automatically adjusting priority assigned to execution of applications, tasks, or workspaces to improve performance relative to other such applications, tasks or workspaces in a computerized multitasking graphical user interface environment. A display of a plurality of visual indicators is provided, each of which corresponds to a differing task. By selection of one of the indicators, the priority given to execution of the task is altered as the task is thereby moved into a focused state as a result of such selection. A window manager interposed between a server and application registers in the server the adjusted state of a particular application as being either set in focus or cleared. An application may detect from the server a window-id corresponding to the application for which an adjustment in priority is desired. A mapper function, lookup table, or the like for mapping window-id to a corresponding process-id is obviated as a result of employing messaging/signalling. The amount of CPU resource then directed to the particular application as a result of the priority alteration is thereby in turn altered. In this manner, a focused application is dynamically provided with added CPU resource relative to remaining tasks, applications, or suites thereof associated with a workspace executing in the multitasking environment.

U.S. Pat. No. 5,874,960 to Mairs, et al. issued Feb. 23, 1999 and entitled "Method and system for sharing applications between computer systems" discloses a method in a computer system for displaying data generated by a shared application on a host computer system on both a host display of the host computer system and a shadow display of a shadow computer systems The host computer system has a window manager for managing windows displayed on the host display. The shadow computer system has a window manager for managing windows displayed on the shadow display. Under control of the host computer system, a Share System executes the shared application. Then, the Share System registers a host window with the windowing system of the host computer system. Upon registration of the host window, the Share System sends a notification of registration of the host window to the shadow computer system. At the shadow computer system, the Share System receives the sent notification of registration of the host window. Upon receiving the sent notification of registration of the host window, the Share System registers a shadow window with the windowing system of the shadow computer system so that the window wing system of the shadow computer system can send messages to the shadow window and receive data to display in the shadow window.

U.S. Pat. No. 5,973,702 to Orton, et al. issued Oct. 26, 1999 and entitled "Oriented view system having a common window manager for defining application window areas in a screen buffer and application specific view objects for writing into the screen buffer" discloses an object-oriented view system that controls the display of screen graphics for a plurality of application programs, each of which generates graphical information for display in a window assigned to it. The view system has a system window manager which is common to all of the application programs and which defines application window areas on the display screen and corresponding application window storage areas in the display screen buffer. Each application program instantiates a view system object from class information in the computer operating system. Each view system object includes a view object with program code that directly stores screen display information generated by the application into the screen buffer. This arrangement allows the application programs to ostensibly avoid the conventional "bottleneck" that develops when all of the screen display information must be stored in the screen buffer by the common system window manager.

U.S. Pat. No. 5,995,103 to Ashe issued Nov. 30, 1999 and entitled "Window grouping mechanism for creating, manipulating and displaying windows and window groups on a display screen of a computer system" discloses a window grouping mechanism for creating, organizing and manipulating windows and window groups for display to a user of a computer system. The window grouping mechanism includes a series of linked data structures configured to organize information pertaining to all windows defined by an application program executing on the computer system. The application program interacts with the window grouping mechanism to further organize the information into any number of window groups each of which contains a different subset of the previously defined windows. These window groups may then be manipulated by the application program to efficiently create various permutations of window groups.

U.S. Pat. No. 6,219,044 to Ansberry, et al. issued Apr. 17, 2001 and entitled "Method for managing top-level windows within a conferencing network system" discloses a method and system for managing top-level windows controlled by a conference enabler is disclosed. The system operates in a conferencing network system having a conference enabler for distributing applications to a plurality of servers. Each server has its own display. The method and system identifies a top-level window sent by the conferenced application. Next, it identifies whether a top-level window is among the requests sent by the conferenced application is a root window. The system then enters a window ID associated with the top-level window into a list of top-level windows. Then, the system provides a slot associated with the top-level window within the list for storing the window configuration of the top-level window as configured by each of the participant servers.

U.S. Pat. No. 6,397,262 to Hayden, et al. issued May 28, 2002 and entitled "Window kernel" discloses a system for managing the interaction of programs, comprising (i) means for storing a set of predetermined characteristics respecting each program to be managed, each set of characteristics including an input signal type characteristic indicative of the identity of the type of inputs signals to which the program associated with the set of characteristics, is responsive and a signal modification characteristic indicative of whether a type of input signal is to be modified by the associated program; (ii) means responsive to input signals having predetermined properties emitted from one of the programs for interrogating each set of predetermined characteristics in a predetermined sequence, determining whether the associated program is responsive to a current input signal, determining whether the properties of the current input signal are to be modified and, if so, modifying the properties of the input signal; and (iii) means for emitting an output signal to the programs determined to be responsive to the input signal.

United States Patent Application Publication 20020009149 to Rodriguez, et al. published Jan. 24, 2002 and entitled "System and method for adaptive video processing with coordinated resource allocation" discloses a system and method for adaptive video decoding. The method for adaptive video decoding includes determining whether a resource constrained mode is to be initiated, and responsive to a determination that the resource constrained mode is to be initiated, initiating the resource constrained mode, including foregoing the decoding of portions of received video input. For example, adaptive video decoding may include foregoing the decompression and reconstruction of selected video frames during intervals of high demand for memory and/or bus bandwidth resources.

United States Patent Application Publication 20020049978 to Rodriguez, et al. published Apr. 25, 2002 and entitled "System and method for access and placement of media content information items on a screen display with a remote control device" discloses a system and method for providing interactive media services in a subscriber network television system. The system receives a first user input from a remote control device indicating a user's desire to select an item of media content information displayed in a user interface on a screen; and receives a second user input from the remote control device indicating a user's desire to drag the item of media content information to a screen destination.

United States Patent Application Publication 20020052977 to Stall published May 2, 2002 and entitled "Method and apparatus for adapting and hosting legacy user interface controls" discloses a method and apparatus for adapting and hosting legacy user interface controls. Legacy user interface controls are exposed within a new window manager as native user interface objects. A bridge between a hosted legacy user interface control and the legacy window manager intercepts messages intended for the hosted user interface control. The messages are filtered to determine if they should be passed to the new window manager. If a message is to be forwarded, the message is forwarded to a root "Visual Gadget" in the new window manager. The message is processed and routed down the window tree to an adapter control for hosting the legacy user interface control. The adapter control processes the message and routes the message to any listener objects attached to the adapter. If the message has not been completely handled, the message is "bubbled" up the window tree to the parent objects of the adapter control for additional processing.

United States Patent Application Publication 20020112090 to Bennett, et al. published Aug. 15, 2002 and entitled "Method, system, and product for a java-based desktop to provide window manager services on UNIX" discloses a window manager proxy method, system, and product allowing a Java based desktop to provide window manager services on UNIX. A computer system executes a UNIX-based operating system and a desktop implemented in Java. The computer system does not include a separate window manager. Java applications are presented by the computer system utilizing a graphical user interface. Native UNIX applications are also presented by the computer system utilizing the same graphical user interface. Native UNIX applications interact with the window manager proxy in the same manner in which they would interact with a traditional window manager. The window manager proxy forwards frame window activity related to the desktop to the Java desktop, and is the native interface from the Java desktop to the native platform for frame window activities. Native UNIX applications, Java applications, and the Java desktop are thus rendered and managed in a consistent manner providing the end user with the look and feel as configured within the Java desktop.

United States Patent Application Publication 20020126144 to Chenede, published Sep. 12, 2002 and entitled "Apparatus and method for communicating graphical display data in a network-based windowing system" discloses apparatus and methods of communicating graphical display data in a network-based windowing system are disclosed. An interface is operable to permit direct access between an application and a window manager, where the window manager is responsible for controlling window layout within at least one workspace in accordance with predefined rules. The interface is operable to provide at least one control module for controlling communication between the application and the window manager and at least one repository of data to be communicated between an application and the window manager. Such an interface enables the provision of a flexible and extensible approach to communicating between an application and a window manager. Such an interface can readily be implemented as an extension to a conventional windowing system.

United States Patent Application Publication 20020191028 to Senechalle, et al. published Dec. 19, 2002 and entitled "Window manager user interface" discloses a window manager having a frame window, with one or more pane windows. Each pane window has a viewing area that is used to display an application. If the application running in the viewing area cannot be fully viewed, a scroll bar and scroll keys are provided to enable the user to scroll through the entire application. The user can quickly and easily create and remove pane windows within the frame window. Pane windows are created by splitting an existing pane window either vertically or horizontally, with the two new split pane windows occupying the space of the original pane window.

When a pane window is closed, one or more of the remaining pane windows are maximized to occupy its space. Accordingly, the window manager enables the pane windows to be dynamically and simultaneously presented to a user. The pane windows do not interfere with one another, and are arranged to maximize the space available in that frame window.

United States Patent Application Publication 20030081664 to Lu, et al. published May 1, 2003 and entitled "Transmit and receive window synchronization" discloses a system for synchronizing sender sliding windows and receiver sliding windows employed in wireless packet communication. The sender sliding window buffers outgoing packets to be sent to a receiver that employs a receiver sliding window to buffer incoming packets. A sender window manager manages the sender sliding window through positive acknowledgement, negative acknowledgement and/or timeout processing to facilitate synchronizing the sender sliding window with the receiver sliding window without employing synchronization messages or master/slave control. Similarly, a receiver window manager manages the receiver sliding window through sequence number analysis to facilitate synchronizing the receiver sliding window with the sender sliding window without employing synchronization messages or master/slave control.

United States Patent Application Publication 20030107604 to Ording published Jun. 12, 2003 and entitled "Method and system for automatic window resizing in a graphical user interface" discloses a method and system for automatically resizing a window displayed within a display area in a graphical user interface environment. Exemplary embodiments of the present invention detect that at least a portion of the window is being dragged between a region inside of the display area and a region outside of the display area. Upon detection, the window is resized while being dragged. The resized window can be redrawn so that the frame of the resized window is displayed in the region inside of the display area.

United States Patent Application Publication 20030181241 Oakes, et al. published Sep. 25, 2003 and entitled "System and method for effectively implementing remote display devices in a gaming network" discloses a system and method for implementing remote display devices in a gaming network, which may include a game console configured to generate game program signals corresponding to a gaming event, and a base unit coupled to the game console for processing the game program signals to produce a game program bitstream. The base unit may then wirelessly transmit the game program bitstream to various remote units which may each be configured to receive the game program bitstream and responsively process the game program bitstream to retrieve the foregoing game program signals. The remote units may then each perform a pixel identification procedure to individually identify different assigned windows from the game program signals. The remote units may also each perform a window zooming procedure to generate remote display video signals corresponding to the assigned windows. The remote units may then each advantageously display one of the remote display video signals in a substantially full-screen manner upon respective remote displays coupled to the remote units.

Various PC-oriented windowing programs exist, including for example the ubiquitous Microsoft Windows® operating system manufactured by Microsoft Corporation, and the MAC O/S (X) offered by Apple Computer Corp. These systems are exemplary of PC or hand-held device operating systems adapted to run multiple applications simultaneously, and manage UI or display windows accordingly. For instance, the recently introduced Apple Exposé system utilizes virtual and protected memory to allow multiple applications to remain open at the same time without having data loss in other applications if one program "crashes". The Exposé system can manage several documents open per application, allowing the user to see all open windows at once, and then switch to the desired window. Alternatively, only the windows of the current program can be displayed.

Despite the broad variety of techniques, the foregoing prior art does not disclose an adequate display element (e.g., window) managing approach which is specifically adapted to digital television environments and their unique set of user input, display, and application harmonization issues. This is particularly acute with respect to the newly developed HAVi environment, which provides a markedly different architecture and issues than those of the prior art, yet provides no elegant solution for cross-application window coordination or management.

Accordingly, there is a need for improved apparatus and methods for providing application display element management and control within, e.g., CATV/HFC networks. These improved apparatus and methods would meet these needs while also enabling compliance with industry standard requirements within the network.

SUMMARY OF THE INVENTION

The present invention addresses the foregoing needs by disclosing an improved display element manager apparatus and associated methods for use in content-based networks.

In a first aspect of the invention, improved CPE adapted for connection to a network is disclosed. The CPE has a plurality of applications running thereon and comprises a display element manager adapted to control the overlapping of two or more display elements between the applications; and provide for control of at least one display element by a privileged application running on the CPE. In one exemplary embodiment, the display elements each comprise display windows, and at least some of the applications are bound to one or more channels or service providers.

In a second aspect of the invention, an improved display element manager adapted for use on a client device within a cable network is disclosed. In one exemplary embodiment, the display element manager comprises a software process stored at least in part on a storage device associated with the client device, and is operative to selectively control the overlapping of two or more display elements between two or more applications running on the client device; and selectively reserve at least portions of a display area associated with the client device to prevent interference between display elements associated with one or more of said applications.

In a third aspect of the invention, an improved "environment agnostic" client device for use within a cable network is disclosed. The improved device generally comprises a plurality of applications including a privileged application operating thereon, with the privileged application being operative to selectively control a plurality of display elements associated with at least one of the plurality of applications irrespective of the application environment thereof. In one exemplary embodiment, the application environment comprises a HAVi environment, and the privileged application comprises an OCAP monitor application. The device also includes a display element manager having a visibility stack which orders HAVi HScenes associated with each of the applications.

In a fourth aspect of the invention, a method of remotely controlling one or more display elements adapted for display on a display device located at premises is disclosed. In one exemplary embodiment, the display device being operatively coupled to a network device such as a DSTB adapted to run at least one application program and communicate with a remote node, the method comprising: (i) providing a display manager having a display management component associated therewith, the display manager running on the network device; and accessing the management component from said remote node. The display manager comprises a software process resident on the network device and includes a visibility stack which maintains display elements associated with the applications running on the device. The remote node (e.g., head-end) can gain access to the stack via the network, and reorder the stack or otherwise control its operation remotely, such as to change display priorities for bound applications.

In a fifth aspect of the invention, an improved method of operating a network device adapted to run a plurality of application programs and communicate with a remote node is disclosed. The method generally comprises: receiving at the network device a signal from the remote node, the signal being adapted to designate at least one of the plurality of applications as privileged; designating, based on the signal, at least one of the plurality of applications as privileged; and selecting, using the privileged application, at least one other application to be given focus within the device. In one embodiment, the network device comprises an OCAP-compliant DSTB, and the designated privileged application comprises an OCAP monitor application. Selecting an application to be in focus comprises altering the location of information relating to that application within a visibility management component (e.g., stack) resident on the network device.

These and other aspects of the invention shall become apparent when considered in light of the disclosure provided below.

BRIEF DESCRIPTION OF THE DRAWINGS

FIG. 2b is a logical flow diagram illustrating an exemplary method of determining applications for visibility/hiding within the stack of FIG. 2a.

DETAILED DESCRIPTION OF THE INVENTION

Figure 1:
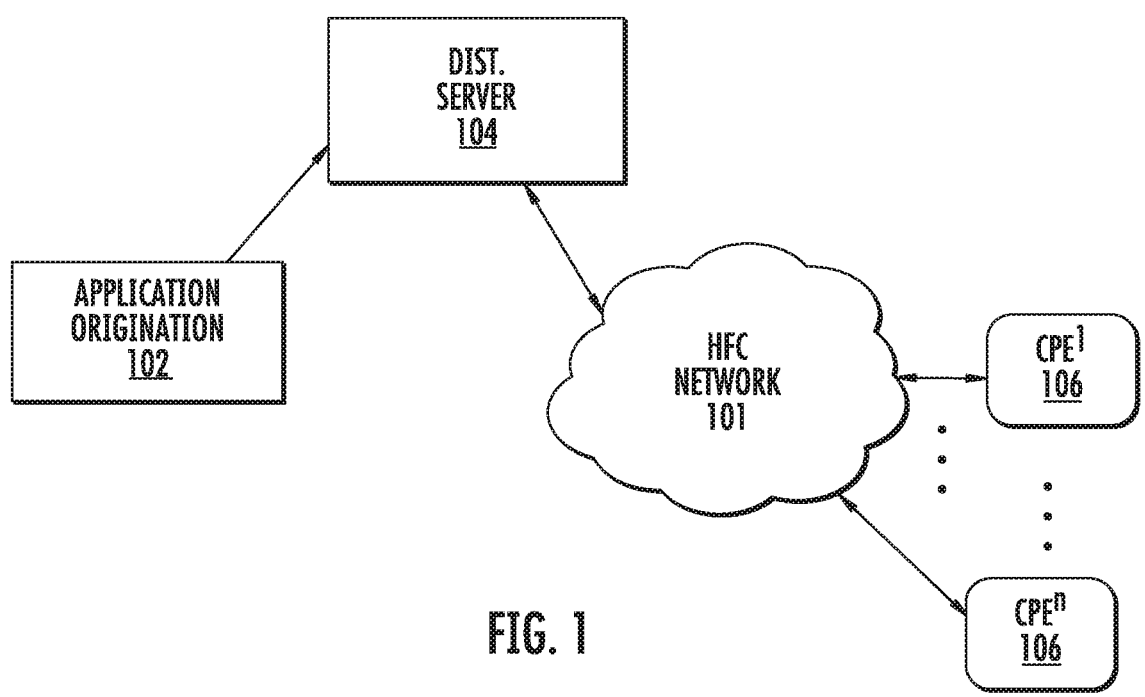
FIG. 1 is a functional block diagram illustrating an exemplary HFC network configuration useful with the present invention.

Reference is now made to the drawings wherein like numerals refer to like parts throughout.

As used herein, the term "display element" refers to any user interface (UI) or other structure adapted to be displayed on a display device including without limitation windows, icons, objects, "tickers" or menus.

As used herein, the term "HAVi" refers generally to the family of Home Audio Video Interoperability specifications for, e.g., consumer electronics including without limitation HAVi Version 1.1.

As used herein, the phrase "the implementation" refers to an implementation of a standard or other system that adopts GEM (e.g., OCAP, ACAP, MHP) an implicitly includes the HAVi user interface (UI). The implementation comprises, without limitation, all of the logic that executes below or within the API sets of the system.

As used herein, the term "application" refers generally to a unit of executable software that implements theme-based functionality The themes of applications vary broadly across any number of disciplines and functions (such as e-commerce transactions, brokerage transactions, mortgage interest calculation, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "middleware" refers to software that generally runs primarily at an intermediate layer in a software or protocol stack. For example, middleware may run on top of an operating system and platform hardware, and below applications.

The term "component" refers generally to a unit or portion of executable software that is based on a related set of functionalities. For example, a component could be a single class in Java™ or C++. Similarly, the term "module" refers generally to a loosely coupled yet functionally related set of components.

As used herein, the term "process" refers to executable software that runs within its own CPU environment. This means that the process is scheduled to run based on a time schedule or system event. It will have its own Process Control Block (PCB) that describes it. The PCB will include items such as the call stack location, code location, scheduling priority, etc. The terms "task" and "process" are typically interchangeable with regard to computer programs.

A server process is an executable software process that serves various resources and information to other processes (clients) that request them. The server may send resources to a client unsolicited if the client has previously registered for them, or as the application author dictates.

As used herein, the term "DTV Network Provider" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Overview

As previously discussed, network standards such as the HAVi specification often do not specify or provide a mechanism for cross-application display element (e.g., window) management. For example, HAVi states that any system using HAVi should define a "home navigation shell" if any window management rules beyond the base HAVi definition are required. HAVi specifies z-ordering and other window management aspects within an application, but does not describe or specify cross-application management. In systems that run disjoint applications concurrently and where each application may display windows, such cross-application windows management is of particular importance.

The present disclosure addresses these shortcomings by defining a cross-application display element management system for, e.g., HAVi/OCAP compliant devices, and more generally useful with most any element or window management system. The exemplary manager disclosed herein advantageously provides the following features and aspects which are not offered by basic HAVi or other similar specifications: (i) control of overlapping windows between applications; (ii) application reservation of screen real estate to prevent overlay by other applications; and (iii) control of window management aspects by a privileged application.

Notably, by providing the ability to allow a privileged application to control the element management system, the present invention may be broadly applied to any number of different application environments (including HAVi).

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having a multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Lastly, although described specifically with regard to windows, it will be appreciated that the invention may be readily extended to other types of display elements.

FIG. 1 illustrates a typical network component configuration with which the window manager apparatus and methods of the present invention may be used. The various components of the network 100 include (i) one or more application origination points 102; (ii) one or more distribution servers 104; and (iii) consumer premises equipment (CPE) 106. The distribution server(s) 104 and CPE(s) 106 are connected via a bearer (e.g., HFC) network 101. A simple architecture comprising one of each of the aforementioned components 102, 104, 106 is shown in FIG. 1 for simplicity, although it will be recognized that comparable architectures with multiple origination points, distribution servers, and/or CPE devices (as well as different network topologies) may be utilized consistent with the invention. For example, the head-end architecture of FIG. 1*a* (described in greater detail below) may be used.

The application origination point 102 comprises any medium that allows an application to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The distribution server 104 comprises a computer system where one or more applications can enter the network system. Distribution servers are well known in the networking arts, and accordingly not described further herein.

The CPE 106 includes any equipment in the "consumers' premises" (or other locations, whether local or remote to the distribution server 104) that can be accessed by a distribution server 104. Such CPEs 106 comprise processors and associated computer memory adapted to store and run the downloaded or resident application. In the present context, at least a portion of the application is typically downloaded to the CPE 106, wherein the latter executes the downloaded application(s)/components, although it will be recognized that all of applications may conceivably be uploaded to the server, or alternatively transferred to another device, such as other networked CPE or the like. Applications may be (i) "pushed" to the CPE (i.e., wherein the distribution server causes the application download to occur), (ii) "pulled" to the CPE (i.e., where the CPE causes the download), (iii) downloaded as the result of some third entity or device (such as a remote server); (iv) resident on the CPE at startup; or (v) combinations of the foregoing.

Figure 1A:
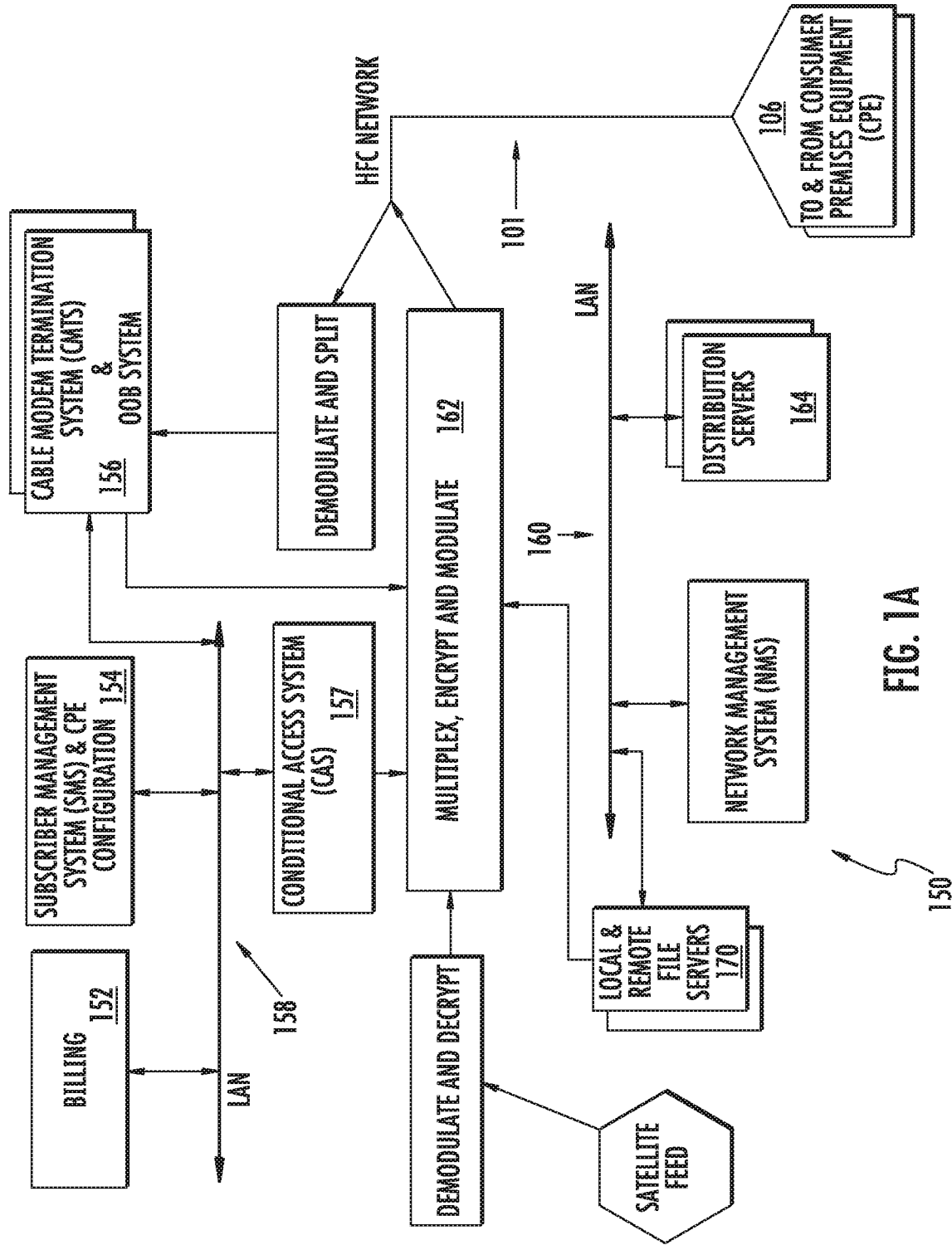
FIG. 1a is a functional block diagram illustrating one exemplary head-end configuration of an HFC network useful with the present invention.

Referring now to FIG. 1*a*, one exemplary embodiment of the network head-end architecture useful with the invention is described. As shown in FIG. 1*a*, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1*a* is high-level, conceptual architecture and that each MSO may have multiple head-ends deployed using custom architectures.

The architecture 150 of FIG. 1*a* further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. In the typical HFC network, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (not shown).

Content (e.g., audio, video, etc.) is provided in each downstream (in-band) channel. To communicate with the head-end, the CPE 106 uses the out-of-band (OOB) DAVIC or DOCSIS channels and associated protocols. The OCAP 1.0 specification provides for networking protocols both downstream and upstream. To distribute files and applications to the CPE 106, the files and applications are configured as data and object carousels and may be sent in both the in-band and OOB channels. As is well known in the art, a carousel may be viewed as a directory containing files. The files of the carousel utilized herein are sent in a continuous round-robin fashion. If the client device misses a desired or necessary file in one carousel transmission, it can wait for the next. Alternatively, in another embodiment, the CPE portion of the application is configured as part of the program content on a given in-band, DAVIC, or DOCSIS channel. As yet another embodiment, the CPE portion is downloaded directly using IP (Internet Protocol) packet traffic in an Out-Of-Band DAVIC or DOCSIS channel. Note that the file carousel or other device providing the application to the CPE 106 via the aforementioned communication channels may be the distribution server 104 previously described, or alternatively a separate device which may or may not be physically co-located with the server (e.g., remote file servers 170 of FIG. 1*a*). For example, a remote file storage device (not shown) with carousel capability may be in data communication with the client device(s) via an out-of-band communications channel as described below, the download of the application files from the remote device being initiated by way of a query from the client device, or alternatively a signal generated by the server 104 and transmitted to the remote device. Many other permutations of the foregoing system components and communication methods may also be used consistent with the present invention, as will be recognized by those of ordinary skill in the field.

Display Element Management

Figure 2:
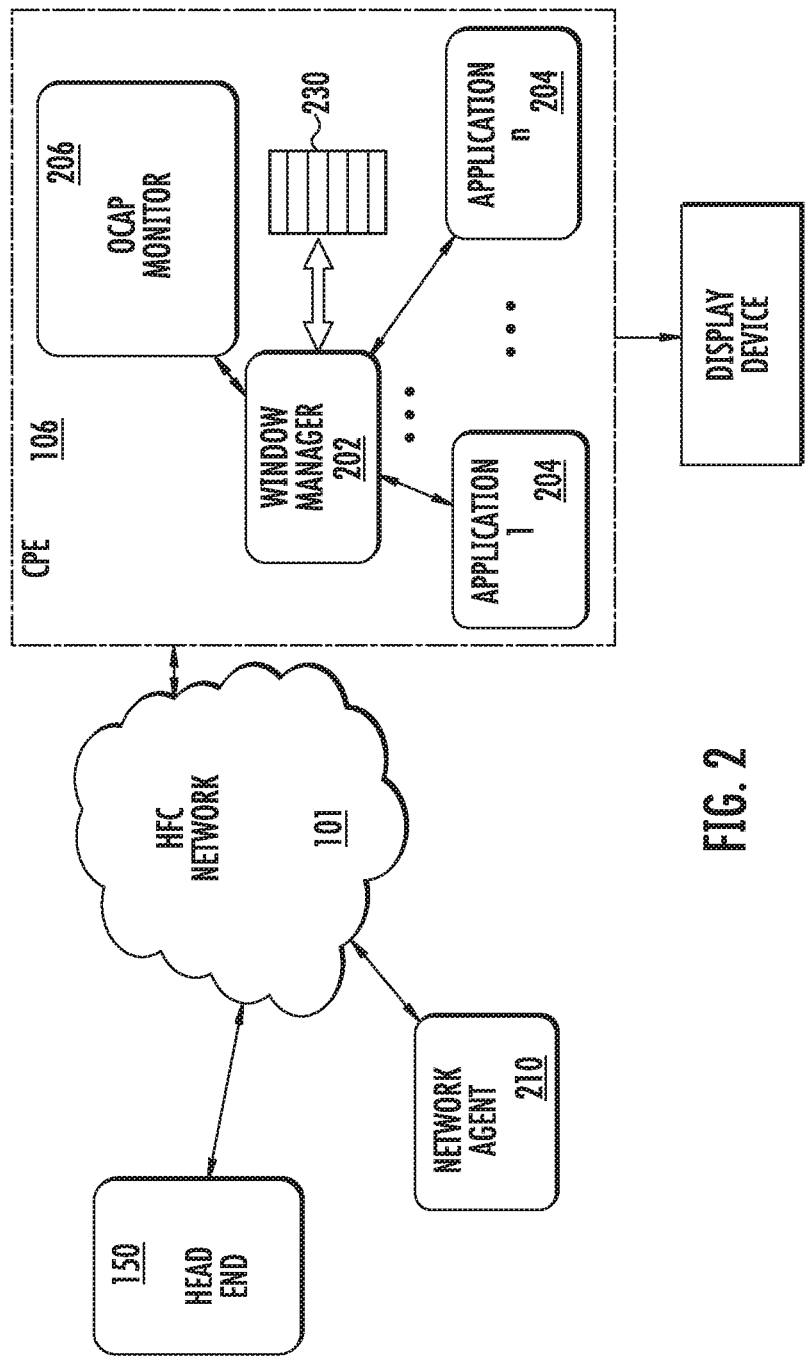
FIG. 2 is a logical block diagram illustrating one exemplary embodiment of the display element manager according to the invention, showing its interactions with other components.

Referring now to FIG. 2, a first exemplary configuration of the display element (e.g., window) manager apparatus of the present invention is described. In the exemplary embodiment, the window manager comprises a computer program or module 202 running on the CPE 106 and adapted to communicate with other applications 204 running on the device 106. The window manager 202 also communicates with, or is the OCAP monitor application 206 running on the CPE, the monitor application being in communication with the head-end 150 or another network agent 210 (e.g., software process or entity) on the network. In this fashion, the head-end and/or network agent can deliver applications (or suites of applications, as described below) to the CPE 106 which can then be coordinated or managed by the window manager 202 during operation of the applications.

In general, there are three approaches to implementing the display of windows associated with multiple applications by the window manager 202; (i) allow a single application at a time to display its window component(s); (ii) allow multiple applications to display windows concurrently, but do not allow overlapping windows between applications (i.e., paned windowing only); or (iii) allow multiple applications to display windows concurrently and allow windows between the applications to overlap. As previously discussed, the HAVi specification permits and controls overlapping of windows within a given single application, but does not address cross-application window management.

Figure 2A:
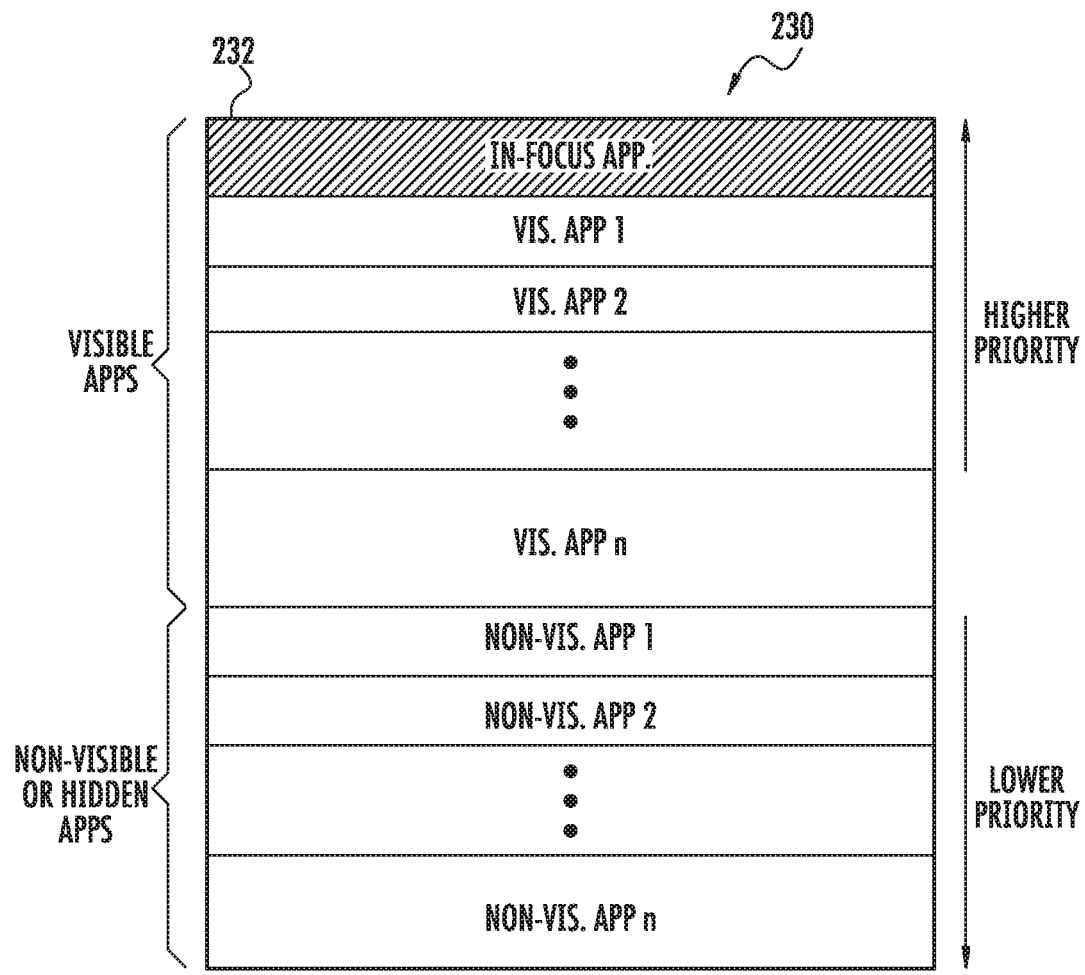
FIG. 2a is a graphical representation of an exemplary visibility stack used with the display element manager of FIG. 2.

Accordingly, the window manager 202 controls the management of (overlapping) windows between two or more applications operating within the relevant software environment. In the exemplary embodiment, a "visibility stack" 230 (FIG. 2a) is maintained by the window manager 202, which indicates those applications 204 which have created a HAVi window hierarchy. In the exemplary embodiment, the HAVi HScene object instances for each application are maintained in the stack. The implementation keeps track of the components in each scene so that information is not needed in the scene stack; however, the implementation is free to keep additional information in the stack if desired. In addition, some information regarding which application has focus is maintained because there are handling rules regarding allowed changes by an application acting as window manager once a consumer has selected an application and caused it to acquire focus. Hence, the window manager 202 is in the illustrated embodiment HAVi specific; only those applications for which a HAVi hierarchy has been created are managed by the stack 230. However, it will be appreciated that in general, any windowing system that associates components with an application could utilize the techniques described herein. It will also be appreciated that while the exemplary stack 230 comprises a virtual rendition maintained in software by the window manager 202, other mechanisms for maintaining the stack 230 may be used including, for example, designating specific regions of memory in the CPE 106 as portions of the stack based on, e.g., address.

Furthermore, the stack 230 need not be maintained physically on the CPE 106, but rather may be stored by another network agent or even the head-end, such as in a file accessible to the CPE/window manager. This approach may be used, e.g., for saving state of the stack, and for use with a distributed window manager that has a portion running in a server.

Additionally, the present invention contemplates the ability of the head-end 150 or a network agent to access the stack 230 maintained on the CPE 106 by the window manager 202 to, e.g., manipulate the stack remotely. For example, where the MSO or other head end process wishes to dynamically change the window display of one or more CPE 106 on the network, they can in effect re-order the stack (including using information sent to the head-end by the window manager 202, such as via OOB channel, for such purpose).

Furthermore, the head-end or agent can also designate (or re-designate) a given application as "privileged", thereby giving it the ability to select other applications to be given focus, as discussed below.

In the exemplary embodiment, a primary factor used when determining the order of applications within the visibility stack 230 is focus. Specifically, at the top 232 of the stack list 230 is that application that is currently "in focus". An application gains focus when one of the following occurs; a) the consumer directly or indirectly selects it, such as via their remote control, b) the application requests focus using the Java AWT Component requestFocus method and gets it, or c) a privileged application (or its proxy) requests that another application gets focus, and that application gets it. Beneath the in-focus application 232, the order of applications in the visibility stack list 230 can be determined by several factors including but not limited to (i) the historical order in which they were selected by the consumer (e.g., the farther back in time they were selected, the lower on the list 230 they will appear); and (ii) re-ordering of the list by a privileged application or other entity with permission to reorder.

With respect to re-ordering, a privileged application or other entity (e.g., head-end or network agent) may re-order applications below the in-focus application based on proprietary criteria, such as for example the importance of applications within a network. Importance may be designated in an absolute or relative sense, such as via a numerical value or sequence order, or even according to a fuzzy logic variable (e.g., "high", "moderate", or "low"). Importance can also be made conditional upon one or more other parameters, such as for example time of day, customer subscription status, etc. Other approaches may be used as well.

In the exemplary configuration, the in-focus application must remain at the top of the stack 230; however, this is not an immutable condition. Specifically, the present invention also contemplates the condition where the in-focus application is not required to be left at the top of the stack. For example, a privileged application (e.g., network agent), may request that the implementation give focus to a different application. Furthermore, if a consumer has not yet selected an application, or an application specifically selected by a consumer has been de-selected by the consumer (i.e., minimize, quit, exit, or similar was selected), then choice of focus transfers to the implementation and focus requests can be considered by the system for designation of the "top-level" stack application.

Figure 2B:
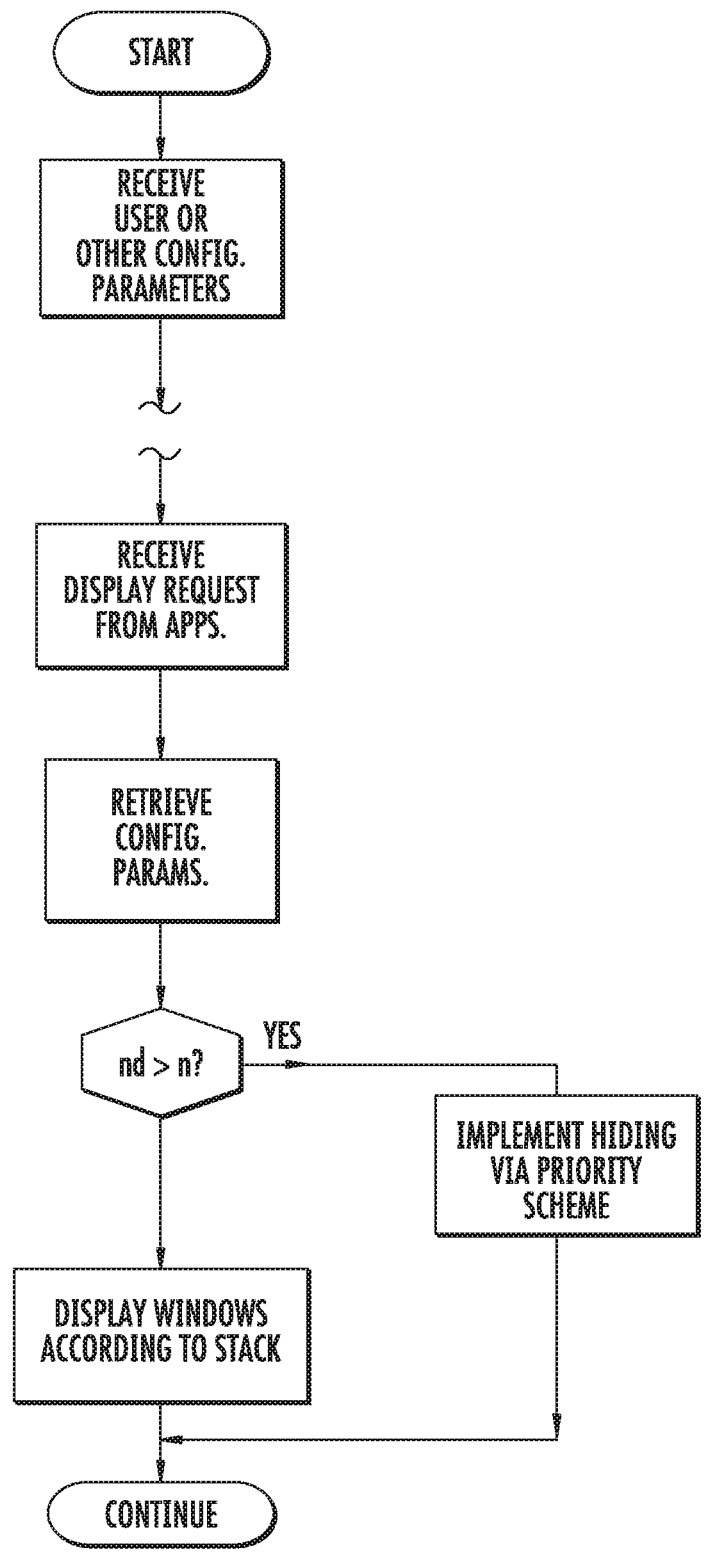

Additionally, windows for some of the managed applications may be optionally or selectively hidden. In one exemplary embodiment (FIG. 2b), a configuration selection function is provided that specifies one or more parameters affecting window display; e.g., a user or programmer can specify a parameter "n" corresponding to the maximum number of applications that can display windows simultaneously. If there are more applications displaying windows ($n_d$) than this parameter n allows for (i.e., $n_d$>n), applications are hidden according to a priority scheme until this parameter is satisfied; i.e., until $n_d$≤n. In one exemplary scheme, application windows are hidden starting from the bottom of the visibility stack and working upwards in stack position; i.e., lowest priority hidden first, next lowest hidden next, and so forth.

In another variant, applications are hidden according to a predetermined hierarchy which is contained within a file resident within the system (e.g., managed by the OCAP monitor application on the CPE). This hierarchy may be dynamically altered, such as through downloading of a new hierarchy file from, e.g., an external source via in-band or OOB channel, or other means.

Alternatively, the hierarchy may be dynamically determined by the OCAP monitor application or other entity resident on the CPE (including the window manager 202).

For example, the relevant entity may evaluate one or more parameters associated with each of the applications within the stack 230 (or just those within the lower portion of the stack that are relevant to the "hiding" determination) in order to assemble a hierarchy. In one embodiment, these application parameters comprise an estimated resource allocation for each relevant application; those requiring more or less resources can be disposed at a higher or lower window display priority within the hierarchy. Alternatively, application type can be used as the basis for prioritization; e.g., frequently used user-interactive applications could be placed higher in the stack, with configuration or similar "background" applications being relegated to the bottom of the stack. Frequency of use can also be a determinant in this process; i.e., the stack can be dynamically allocated according to periodic or opportunistic updates based on recent usage (e.g., time of use, number of invocations of that application, etc.). Myriad other types of schemes can be used as well.

It will also be recognized that the "hiding" variable (e.g., n) can be dynamically varied or determined. While the foregoing examples assume a static value of n, alternate embodiments of the invention permit n or other similar parameters to be selected based on extrinsic information, such as the configuration of the CPE on which the application window manager 202 is running (e.g., model/type, available CPU or memory resources), the total number of applications running (e.g., n is selected so as to maintain a certain percentage of the running applications hidden), or even information relating to components or entities at other locations on the network (such as the head-end 150 or a third-party content provider).

In the context of HAVi, an application is permitted to request focus for a component. Getting focus in this manner makes the application's window components visible, and places them over the components of other applications within the stack 230. In addition, the in-focus application is placed at the top 232 of the application visibility stack.

In addition to the basic HAVi focus concept described above, the present invention advantageously provides for the creation or identification of one or more application groups or suites (see discussion of Appendix I provided subsequently herein). Specifically, this feature allows multiple (e.g., two or more) applications to be associated. It is noted that HAVi maintains relationships between components (per application). Hence, applications in a suite can share associations between their suites, but components from different scenes are not interspersed. When a scene is moved in the stack, all of its components are moved with it. This approach is used because (i) it eliminates contention in that all components are owned by a single application, and that application knows their context; and (ii) interspersing of components of different applications would make the rendered display confusing unless the applications were programmed to communicate very closely. However, such close level of communications also makes the functionality of the applications very similar, and hence the functionality is more efficiently disposed within a single application. In addition, because of the nature of the walled gardens, applications running within in an OCAP implementation require significant overhead when communicating with other applications.

The foregoing associations may be purely functional and not based on any other criteria, or alternatively may be defined according to a higher level logical or association scheme. For example, all of the applications associated in a given group or suite may bear no logical or other relationship to one another, their only common attribute being linkage via the association mechanisms described herein. Alternatively, the applications within the group may be related by one or more attributes, such as common theme, common size, common resource requirements, a given service provider or content channel, etc. Furthermore, interrelationships between activities called within one application may be the basis of grouping, such as where on application potentially or necessarily invokes another application when running. A plethora of other types of relationships can be used as the basis for grouping according to the present invention.

Figure 2C:
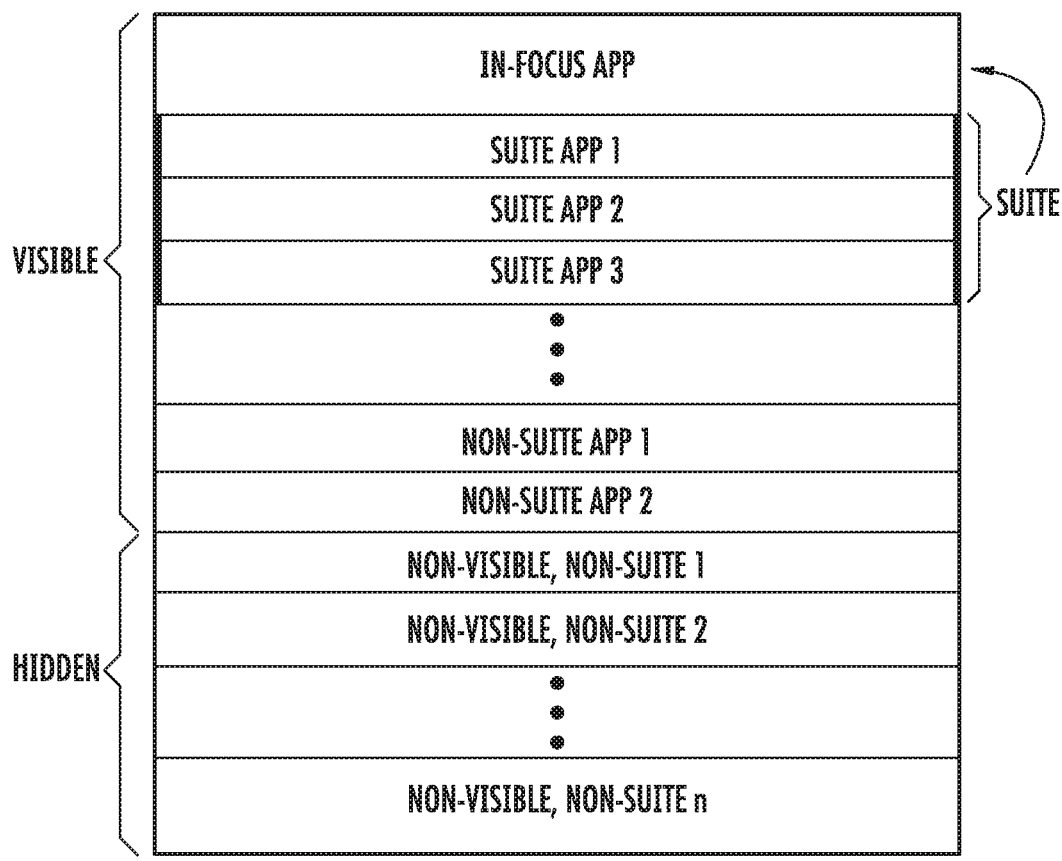
FIG. 2c is a graphical representation of an exemplary visibility stack used with the display element manager, the stack having a suite of associated applications relating to the in-focus application.

In one exemplary configuration, the applications within a group or suite 236 are linked such that when one application 232 is given focus, other applications 240 within that suite 236 can be placed directly underneath it in the visibility stack 230 (FIG. 2c). This is accomplished by simply moving the associated applications up from their current locations if necessary. The ordering of the associated applications does not change except when the focused application changes, and is moved on top of the others. Generally, all applications in the associated suite will be within the visible (i.e., non-hidden) portion of the stack 230; however, this is not a prerequisite. For example, some suites may contain "background" applications which run yet which only have a lower display priority.

When focus is given to a new application and the application is already part of the focused suite 236, the only change is moving the application to the top of the visibility stack. When focus is changed and the application getting the focus is not in the focused suite 236, then the entire suite is moved in the visibility stack.

Figure 2D:
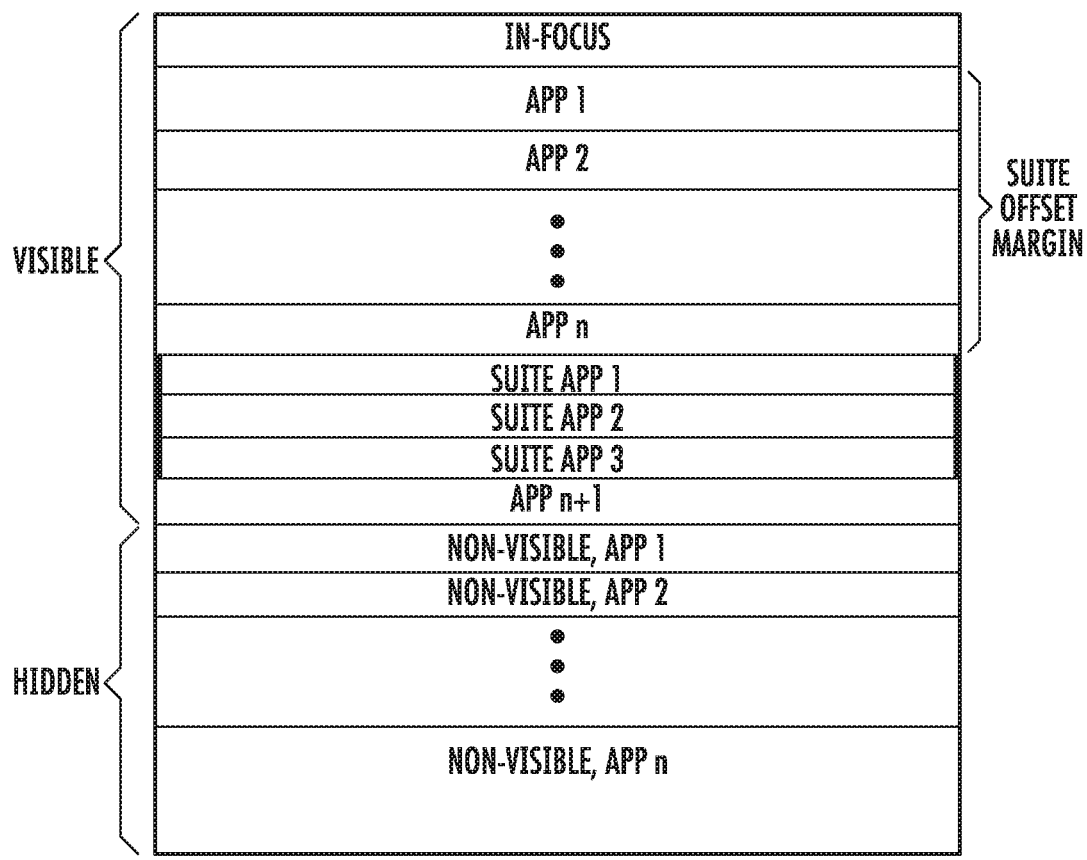
FIG. 2d is a graphical representation of an exemplary visibility of FIG. 2c, the suite having a fixed offset from the in-focus application.

Additionally, the linking described above is not limited to placement in the stack 230 of the linked (non-focus) applications directly below the in-focus application 232. For example, various schemes can be applied, such as fixed offset placement (i.e., where the linked non-focus applications are placed beginning or ending with a fixed offset from the in-focus application, as shown in FIG. 2d), conditional placement (i.e., where one or more other criteria are evaluated as a condition precedent to reorganizing the stack), or placement of the linked applications directly below or with an offset according to a hierarchy ranking (i.e., where one or more non-linked application may have a higher hierarchy than at least one of the linked applications). Any number of different linking schemes can be used with the invention, as will be recognized by those of ordinary skill in the software programming arts.

Application Reservation of Screen Real-Estate

As is known, HAVi allows for components within an application to request certain portions of the display screen. However, applications that are not properly associated may overlap each other's components in a fashion not controllable by HAVi. This may be undesirable, for example, when one application is a ticker, menu bar, or the like that a user wishes to expose at all times. Accordingly, in another aspect of the window manager of the resent invention, a mechanism is provided whereby applications running within the system (e.g., CPE) can reserve screen real estate that can never be overlapped, or alternatively can only be overlapped according to certain criteria. These criteria include, for example, circumstances where: (i) the reservation is made only against applications not in the reserving application's suite or linkages (i.e., conditional reservation based on group or suite membership); (ii) user-specified overrides of the general preemption of no overlapping of windows (e.g., where the user directly or indirectly selects an option within an application that overrides the exclusive reservation); and/or (iii) emergency alert messages. These two modes, i.e., "never overlapping" or "conditionally overlapping" can also be implemented such that they can be selected by the user (such as via a configuration menu) or alternatively reserved for programmer or even head-end/MSO control.

As will be appreciated, the exclusive reservation of screen real-estate consumes some fraction (or even all) of a finite resource in a mutually exclusive fashion and should be exercised with care. Accordingly, the window management system of the present invention can also be implemented with innate "intelligence" in this regard; e.g., dynamically permitting either exclusive reservation or conditional reservation as a function of system hardware and/or software parameters. In one variant, the window manager monitors resources available within the CPE or other user device in order to enable exclusive reservation; where available resources are depleted beyond a predetermined (or dynamic) threshold, the window manager will automatically disable exclusive reservation and enforce conditional reservation in an effort to conserve the depleted resource(s).

Figure 3:
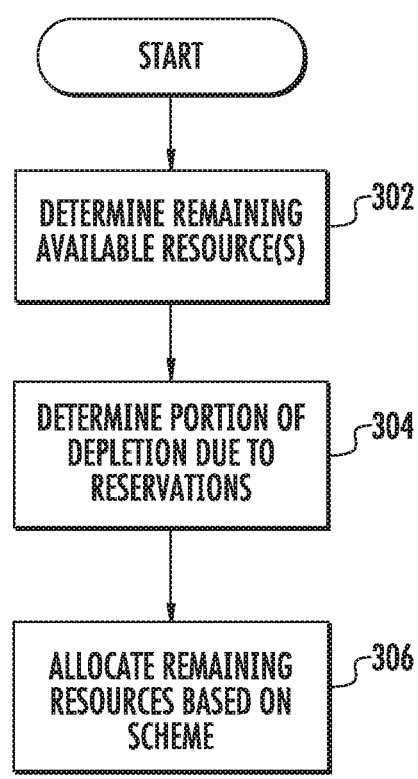
FIG. 3 is a logical flow diagram illustrating an exemplary method of progressively allocating window overlap according to the invention.

Additionally, the transition from exclusive to conditional reservation need not be binary in nature, but rather can also be implemented in a progressive manner; e.g., increasing the allowed degree of encroachment of one application's window onto the real estate of another (reserving) application when resources are limited. For example, in one embodiment (FIG. 3), the window manager is adapted to (i) determine the available or remaining resource level(s) per step 302, (ii) determine the portion of the depletion fraction of the measured resource(s) attributable to application exclusive reservations (step 304), and (iii) allocate the remaining portion of the resource(s) according to an allocation scheme (step 306). In one variant, the allocation scheme comprises a simple proportional allocation; i.e., the new (requesting) application is allocated real estate, or allowed to encroach, in direct proportion to the level of the resource used, as reflected in the exemplary relationship of Eqn. (1):

$$E_e \alpha (100 - L_r) \qquad \text{Eqn. (1)}$$

Where:
  $E_e$=Allowed encroachment of requesting application (percent of resource reserved by reserving application); and
  $L_r$=Level of un-reserved remaining resource(s) as a percent of total.

Hence, where 50% of the resource is used, 50% encroachment is allowed. Alternatively, an offset or threshold can be applied, such that the phase-in of encroachment will not occur until after the threshold or offset value is reached. Any number of different relationships, whether mathematical (e.g., linear, logarithmic, step-wise), fuzzy, or otherwise can be used consistent with this feature. Additionally, the conditional criteria previously described herein can be applied in conjunction with the encroachment, such as where proportional encroachment is only allowed for emergency messages, or for applications within the reserving application's suite or linkages.

Figure 3A:
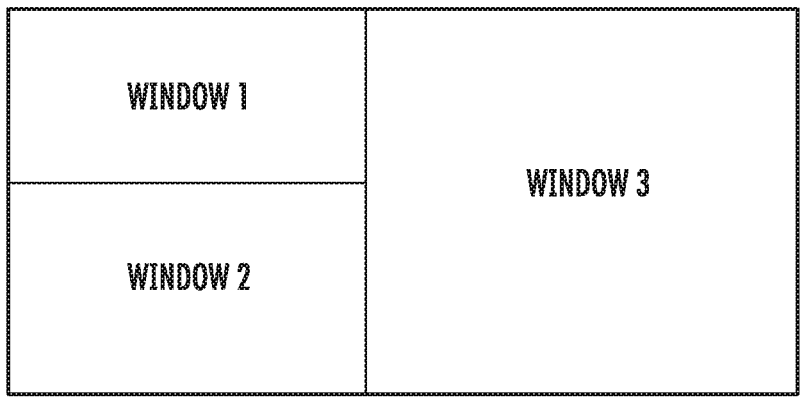
FIG. 3a is a graphical representation of exemplary windowed screen displays generated by the window manager of the present invention, illustrating various levels of encroachment or overlap by multiple windows.
Figure 3A:
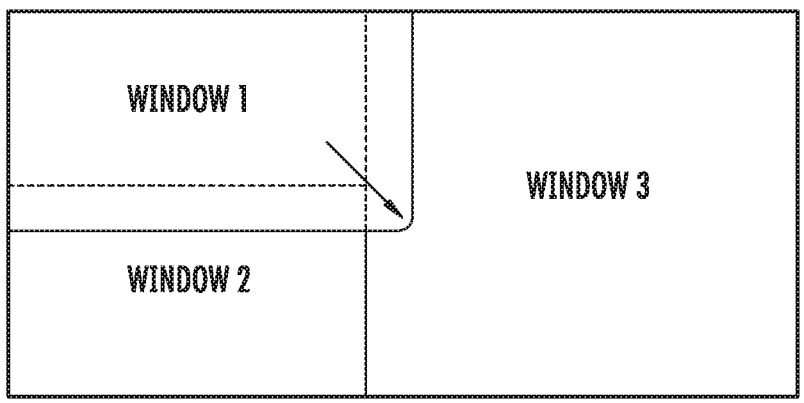
Figure 3A:
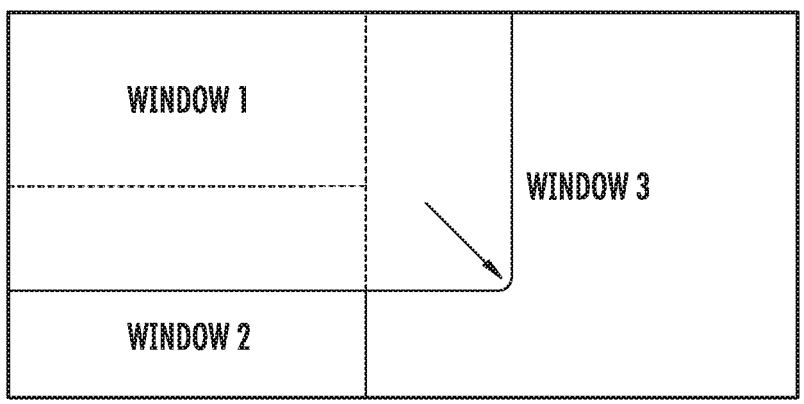

It will further be recognized that display elements (e.g., windows) need not maintain a static size consistent with the invention. For example, in one variant, the encroachment is allocated through variable sizing of the window or other display element to be displayed (see FIG. 3*a*). In the case of a window, proportionate encroachment may comprise resizing the window from a point of no encroachment (such as where the aforementioned encroachment threshold has not yet been reached), to a size which encroaches according to the desired proportion. This can be accomplished using automated window resizing algorithms of the type well known in the personal computer programming arts (such as in the Microsoft Windows® system, wherein a user can effectively grab a window corner to enlarge the window without affecting the layout of the contents, fonts, data structures, etc. contained within the window. Alternatively, the resizing algorithm can be made fully proportional, such as where all displayed elements within the window are resized as well (somewhat akin to electronically resizing a JPEG or other image). Various other approaches may also be used.

Additionally, the exemplary OCAP implementation uses a basic application priority scheme. Thus, if an application owns some screen real estate and another application with a higher priority requests some or all of the same space, the implementation will be forced to take it away from the owning application, unless a monitor application is registered as the resource contention handler and over-rules the higher priority application's request.

Privileged Application Control of Window Management

When a retail or other client device is connected to a network such as an MSO-based cable network, the network may provide services that require management that cannot be offered by the client device. This is due to the simple fact that client devices cannot be programmed with all of the network specifics of every network to which it might be connected. This is especially true for "thin" client devices which have limited storage resources. Thus, it is desirable to allow an application developed for the specific network environment in which the target client device will be used to be downloaded to that device to control such aspects.

Any application that asserts controlling or management aspects in a client device must have appropriate permission from either the device or the network, depending upon the aspect being controlled. For window management control in the aforementioned cable network, a network application running on the client device must be given appropriate permissions from the MSO. Window management aspects that are controllable by such a "privileged" application include, for example: (i) requesting that focus be transferred to a specific application; (ii) re-ordering the visibility stack (except for the application in focus, which stays on top until focus changes according to the illustrated embodiment); and (iii) resolving screen real estate request conflicts.

Regarding Item (ii), the exemplary embodiment of the invention sets the resolution of re-ordering control to be at least the set of application suites, and/or applications within individual application suites. Furthermore, HScene components between applications are not interspersed for reasons as previously described.

Software Implementation

Figure 4:
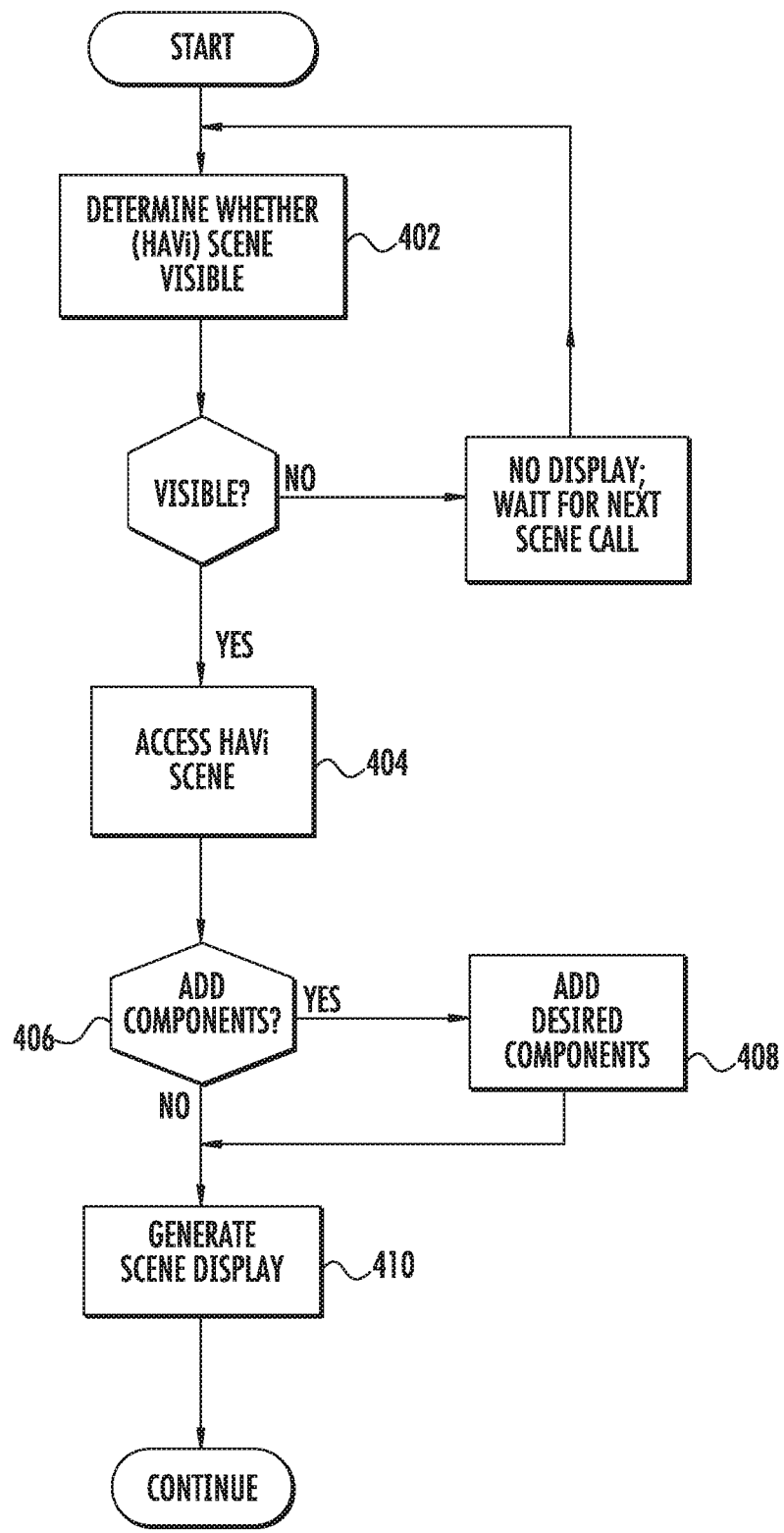
FIG. 4 is a logical flow diagram illustrating an exemplary embodiment of the method of generating display elements according to the invention.

Referring now to FIG. 4 and Appendices I-V hereto, one exemplary implementation of the window manager according to the present invention is described. It will be recognized that while the following discussion (and code) is rendered with respect to the exemplary HAVi-based embodiment operating in a Java environment, the invention may also be readily practiced in other standards, software environments (including, without limitation C, C++, and Ada), and within various middleware environments (e.g., MHP, OCAP, MHEG, ACAP). Furthermore, the following discussion illustrates but a sample of the possible constructs within the Java environment that are useful with the broader principles of the invention.

Appendix I (AppSuite) is an exemplary class representing a suite of applications that are associated by a host device (e.g., CPE or user device) implementation observing signaling from a network. This signaling indicates for example broadcast services, and the applications resident on the host device that are part of each service provided. It will be appreciated that such services may be bound to a broadcast channel, or may be unbound to group a suite of applications. For example, in the cable context, MHP defines bound applications, and OCAP adds the concept of unbound applications. Bound applications are bound to a service, such as NBC network. When the CPE is tuned to NBC, the bound applications owned by NBC are launched and enabled to run. When the CPE is tuned away from NBC, the bound applications are automatically killed, unless they appear in the next channel to which the user has tuned. This might also be the case for a group of related channels, such as HBO1, HBO2, etc., where the same applications run in each of those channels. Conversely, unbound applications are not tied to a service per se. They are signaled by a table in the OOB channel, and such signaling is always present regardless of the channel to which the user is tuned. Any application or application suite that is unbound will be launched separately from the tuned channel, and is not affected by various service selections.

Appendix II (SuiteStackedChangedEvent) is an exemplary class representing a change event to the display visibility stack 230 previously described. The visibility stack 230 contains applications scenes, which may be visible or hidden. Each application has one scene (i.e., HAVi HScene) associated with it. Each HScene comprises a java.awt.Container class and so can contain java.awt.Components. HAVi goes on to define a set of components, a.k.a. widgets. If a scene is visible, all of the components it contains that are not obscured are visible. When the scene is hidden, so are all of its components. An HScene has no frame or border so the only entity associated with scene display are its components.

Appendix III (SuiteStackListener) is an exemplary interface that allows a privileged application or other entity to listen for change events to the screen visibility stack 230.

To display graphical components in a system using HAVi (FIG. 4), an application will first determine whether its HAVi scene is within the visible or hidden portion of the stack (step 402). This is accomplished via the window manager 202 (i.e., an application can discover its visibility by passing its HScene to a window manager method. If within the visible portion, then the application accesses its HAVi scene (Hscene) using the HsceneFactory (Appendix IV), or a redundant system specific call (step 404). As is well known, Hscene is a HAVi public class which extends the Hcontainer and acts as the base window for all HAVi applications. HScenes cannot be instansiated directly, but rather discovered via HSceneFactory.

Once an application discovers their HScene, they may then add displayable (and even navigable or user-interactive) components to the accessed HScene to implement application-specific graphics (steps 406-408). Next, per step 410, the accessed and modified scene is generated on the viewer's display device. Any navigable components added to the Hscene can be traversed, for example, using an input device such as wireless or wired remote control unit of the type ubiquitous in the art.

The exemplary HSceneTemplate (Appendix V) advantageously allows an application to query its Hscene and, if desired, set attributes thereof such as screen dimensions, coloration, resolution, etc. as is well known in the relevant art.

It will be further recognized by those of ordinary skill given the present disclosure that multiple approaches for implementing the disclosed (e.g., HAVi) extensions may be utilized. For example, in the exemplary context of the HAVi framework, implementation of the screen area reservation described above can be accomplished with the HSceneTemplate (Appendix V) using a new user interface (UI) containing methods to reserve screen real estate. Similarly, for all of the other described managerial functions, the HSceneFactory can implement a new UI. These interfaces can be mandated by any specification or standard that adopts the HAVi UI. For example, GEM incorporates parts of MHP that require the HAVi UI, and OCAP complies. ACAP references GEM (and hence HAVi UI via MHP) as well.

Figure 5:
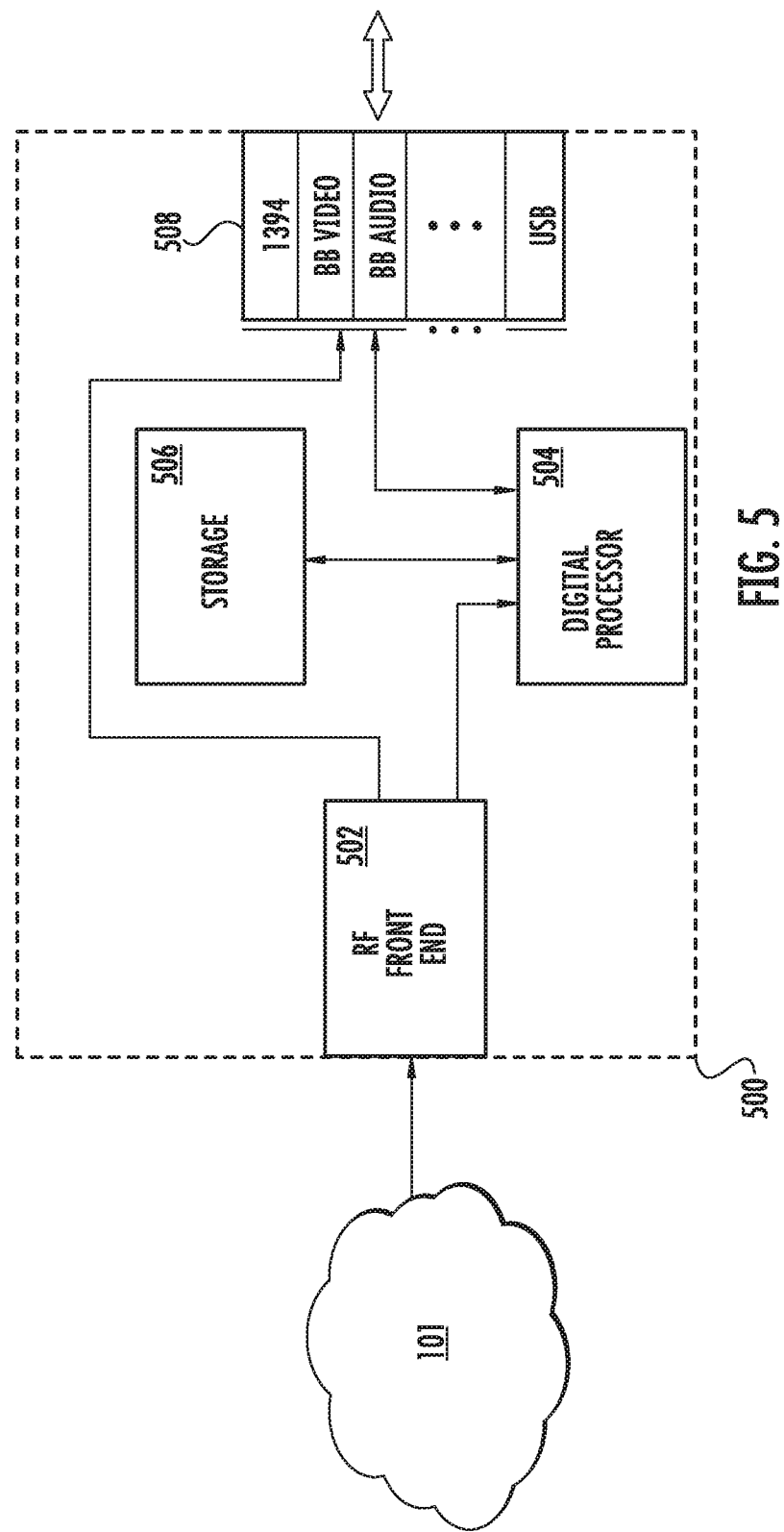
FIG. 5 is a functional block diagram of exemplary CPE having the improved error logging and management system.

FIG. 5 illustrates a first embodiment of the improved electronic device with window management capability according to the present invention. As shown in FIG. 5, the device 500 generally comprises and OpenCable-compliant embedded system having an RF front end 402 (including modulator/demodulator) for interface with the HFC network 101 of FIG. 1, digital processor(s) 504, storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 5 for simplicity) include RF tuner stages, various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein.

The device 500 of FIG. 5 is also provided with an OCAP 1.0-compliant monitor application and Java-based middleware which, inter alia, manages the operation of the device and applications running thereon. It will be recognized by those of ordinary skill that myriad different device and software architectures may be used consistent with the display element manager of the invention, the device of FIG. 5 being merely exemplary. For example, different middlewares (e.g., MHP, MHEG, or ACAP) may be used in place of the OCAP middleware of the illustrated embodiment.

As previously described, the window manager 202 of the present invention is typically disposed on the device 500 such as on the mass storage device 504, along with a plurality of applications 204. During operation, the window manager 202 maintains and updates the visibility stack 230 such that the in-focus application 232 is maintained at the top of the stack, and the remaining applications (whether in a suite such as the AppSuite class of Appendix I, or otherwise) are ordered there below. The implementation 202 can detect the "privileged" status of one or more applications using Java permissions defined by the applicable standard. In addition to changing the in-focus application, this privileged application can also monitor the stack for change events using the SuiteStackListener interface (Appendix III).

It will further be recognized that the window managing system and methods of the present invention can also advantageously be used in conjunction with (and without interfering with) other functions resident in the CPE, such as for example the hardware registry described in co-owned U.S. patent application Ser. No. 10/723,959 filed Nov. 24, 2003 entitled "METHODS AND APPARATUS FOR HARDWARE REGISTRATION IN A NETWORK DEVICE", and issued as U.S. Pat. No. 8,302,111 on Oct. 30, 2012, and the error logging functionality described in co-owned U.S. patent application Ser. No. 10/722,206 filed Nov. 24, 2003 entitled "METHODS AND APPARATUS FOR EVENT LOGGING IN AN INFORMATION NETWORK", which issued as U.S. Pat. No. 7,266,726 on Sep. 4, 2007, both incorporated herein by reference in their entirety. For example, events or errors generated through access or manipulation of the hardware registry and its various associated options (such as a hardware failure or contention deadlock) can be stored and accessed by the window manager 202, such as for use in determining application priority within the stack (e.g., prior failure or deadlock may cause that particular application to be decremented within the visibility stack 230, especially if the error was a display error). Similarly, the window manager 202 can register with and issue error reports relating to, e.g., display stack or application operation. The event logger can be used to inform a registered handler, such as the monitor application, of error or informative messages. The head-end can then query the registered handler for those messages.

Furthermore, the window manager 202 can also be adapted to access the aforementioned hardware registry as part of its application prioritization process within the stack. Myriad other possible uses and interactions between the various inventions are also possible, as will be recognized by those of ordinary skill.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I - AppSuite
© Copyright 2003-2004 Time Warner Cable, Inc. All rights reserved.

```
import org.dvb.application.AppID;

/**
 * This class represents a suite of applications that are associated by a
Host device implementation observing signaling from a network indicating
broadcast services and the applications that are part of each service.  Note
that a service may be bound to a broadcast channel (e.g., NBC), or it may be
unbound to group a suite of applications.
 */
public interface AppSuite
{
    /**
     * Gets the application identifiers of the applications that are part of
this suite.
     *
     * @return A array of application identifiers that are part of this
suite.
     */
    public AppID [] getAppIDs();

/**
     * Adds an application identifier to this suite.
     *
     * @param appID Application identifier of the application to add to this
suite.
     *
     * @throws SecurityException specific to the implementation type (e.g.,
MHP, OCAP, ACAP).
     */
    public void addAppID(AppID appID) throws SecurityException;
}
```

APPENDIX II - SuiteStackedChangedEvent
© Copyright 2003-2004 Time Warner Cable, Inc. All rights reserved.

```java
import java.util.EventObject;
import org.dvb.application.AppID;

/**
 * This class represents a change event to the Screen visibility stack.  The
visibility stack contains applications scenes, which may be visibile or
hidden.
 */
public class SuiteStackChangedEvent extends EventObject
{
    /**
     * A suite was moved to the front of the screen visibility stack.
     */
    static final int POP_SUITE_TO_FRONT_OF_SCREEN = 0;

/**
     * A suite was moved to the back of the screen visibility stack.
     */
    static final int PUSH_SUITE_TO_BACK_OF_SCREEN = 1;

/**
     * An application was moved to the front of a suite's application stack.
     */
    static final int POP_APP_TO_FRONT_OF_SUITE = 2;

/**
     * An application was moved to the back of a suite's application stack.
     */
    static final int PUSH_APP_TO_BACK_OF_SUITE = 3;

/**
     * An application was moved forward one position in a suite's application
stack.
     */
    static final int POP_APP_UP_IN_SUITE = 4;

/**
     * An applicatin was moved back one position in a suite's application
stack.
     */
    static final int PUSH_APP_BACK_IN_SUITE = 5;

// Application suite associated with this event.
    private AppSuite suite = null;

// Application ID associated with this event.
    private AppID appID = null;

// Event code of this event, see event code definitions above.
    private int eventType;

/**
     * Constructor which can be used for any events not associated with an
application
     * identifier.
```

```
 *
 * @param source Object generating the event.
 * @param eventType Event type as defined by this class.
 * @param suite Application suite associated with this event.
 */
public SuiteStackChangedEvent(Object source, int eventType, AppSuite suite)
{
    super(source);
    this.eventType = eventType;
    this.suite = suite;
}

/**
 * Constructor which can be used for any events not associated with an application
 * identifier.
 *
 * @param source Object generating the event.
 * @param eventType Event type as defined by this class.
 * @param suite Application suite associated with this event.
 * @param appID Application identifier associated with this event.
 */
public SuiteStackChangedEvent(Object source, int eventType, AppSuite suite, AppID appID)
{
    super(source);
    this.eventType = eventType;
    this.suite = suite;
    this.appID = appID;
}

/**
 * Gets the suite the event is associated with.
 *
 * @return The suite associated with the event.
 */
public int getEventType()
{
    return this.eventType;
}

/**
 * Gets the suite the event is associated with.
 *
 * @return The suite associated with the event.
 */
public AppSuite getSuite()
{
    return this.suite;
}

/**
 * Gets the application ID of the application associated with the event
 * if applicable.
 *
 * @return AppID of the application associated with the event or null if not
```

```
 *       applicable.
 */
public AppID getAppID()
{
    return this.appID;
}

}
```

APPENDIX III - SuiteStackListener
© Copyright 2003-2004 Time Warner Cable, Inc. All rights reserved.

```
/**
 * This interface allows a privileged application to listen for change events
to the Screen visibility stack changes.
 */
public interface SuiteStackListener
{

/**
     * Implementation notifies the listener of changes to the Screen
visibility stack by calling this notification method.
     *
     * @param ssce Event indicating the change to the stack.
     */
    public void suiteStackChanged(SuiteStackChangedEvent ssce);
}
```

APPENDIX IV - SystemSceneFactory
© Copyright 2003-2004 Time Warner Cable, Inc. All rights reserved.

```
import org.havi.ui.HSceneFactory;
import org.havi.ui.HScene;
import javax.tv.service.Service;
import org.dvb.application.AppID;

/**
 * Any specification or standard mandating a HAVi window manager that
includes SystemSceneFactory, or equivalent interface with a different name
mandates that HSceneFactory implements this interface.
 *
 * Methods that throw SecurityException do so when the caller does not have
appropriate permission as specified by the implementation type (e.g., MHP,
OCAP, ACAP).
 */
public interface SystemSceneFactory
{

/**
     * Requests input focus for the parameter scene.  If focus is given, the
scene will be placed on top of the scene z-ordering stack, and the gotFocus
method of the scene parameter will be called.  Applications can request focus
using Component.requestFocus(). However, this method is intended as a proxy
so that a controller application can request focus for another application.
     *
     * @param scene HScene to transfer focus to.
     *
     * @return True if focus given, false otherwise.
     *
     * @throws SecurityException specific to the implementation type (e.g.,
MHP, OCAP, ACAP).
     */
    public boolean requestSceneFocus(HScene scene) throws SecurityException;

/**
     * Gets the current order of visible and hidden scenes within the screen
visibility stack.
     *
     * @return The Screen visibility stack which contains both hidden and
visible applications.
     */
    public AppSuite [] getScreenSceneOrder();

/**
     * Sets a listener for screen visibility stack changes.
     *
     * @param listener The new listener.
     *
     * @throws SecurityException specific to the implementation type (e.g.,
MHP, OCAP, ACAP).
     */
    public void setSuiteStackListener(SuiteStackListener ssl) throws
SecurityException;

/**
```

```
     * Gets an application suite assigned to a Service by the implementation
of the Host device when the Service is signaled by a network.  Service is
defined by standards such as OCAP, MHP, GEM, and ACAP.  Service suites are
automatically created for bound or unbound services as per standards service
definitions.
     *
     * @param service - Service to get the group Id for.
     *
     * @return The group Id of the parameter Service.
     */
    public AppSuite getAppSuiteForService(Service service);

/**
     * Creates an AppSuite.
     *
     * @param appIDs Array of AppID's to be used to create the suite.
     *
     * @throws SecurityException specific to the implementation type (e.g.,
MHP, OCAP, ACAP).
     * @throws IllegalArgumentException if the appIDs parameter is null,
empty, or contains
     *         an invalid AppID.
     */
    public void createAppSuite(AppID [] appIDs)
                                        throws SecurityException,
IllegalArgumentException;

/**
     * Pops a scene to the front a an application suite.  If this causes the
scene to go to the very front of all applications, requestSceneFocus will be
called for the scene.  If requestSceneFocus fails, the pop will fail.
     *
     * @param scene The scene to pop to the front of the group.
     * @param suiteId The Id of the group the application that owns the scene
belongs to.
     *
     * @return True in all cases unless the pop causes the scene to go to the
top of all other scenes.  In that case requestSceneFocus is called and the
result of that call is returned.
     *
     * @throws SecurityException specific to the implementation type (e.g.,
MHP, OCAP, ACAP).
     * @throws IllegalArgumentException if scene or suiteId are not already
assigned.
     */
    public boolean popSceneToSuiteFront(HScene scene, int suiteId)
                                        throws SecurityException,
IllegalArgumentException;

/**
     * Pushes a scene to the rear of an application suite.
     *
     * @param scene The scene to push to the rear of the suite.
     * @param suiteId The Id of the suite the application that owns the scene
belongs to.
     *
     * @throws SecurityException specific to the implementation type (e.g.,
MHP, OCAP, ACAP).
```

```
     * @throws IllegalArgumentException if scene or suiteId are not already
assigned.
     */
    public void pushSceneToSuiteRear(HScene scene, int suiteId)
                                                throws SecurityException,
IllegalArgumentException;

/**
     * Pushes a scene back one position in the visibility stack of a suite.
     *
     * @param scene The scene to push to the rear of the suite.
     * @param suiteId The Id of the suite the application that owns the scene
belongs to.
     *
     * @throws SecurityException specific to the implementation type (e.g.,
MHP, OCAP, ACAP).
     * @throws IllegalArgumentException if scene or suiteId are not already
assigned.
     */
    public void pushSceneBackInSuite(HScene scene, int suiteId)
                                                throws SecurityException,
IllegalArgumentException;
    /**
     * Pops a scene forward one position in the visibility stack of a suite.
     *
     * @param scene The scene to push to the rear of the suite.
     * @param suiteId The Id of the suite the application that owns the scene
belongs to.
     *
     * @throws SecurityException specific to the implementation type (e.g.,
MHP, OCAP, ACAP).
     * @throws IllegalArgumentException if scene or suiteId are not already
assigned.
     */
    public void popSceneForwardInSuite(HScene scene, int suiteId)
                                                throws SecurityException,
IllegalArgumentException;

/**
     * Pops a suite to the front of all other suites visible or hidden in the
screen visibility stack.  If the suite is not already at the front this will
cause requestSceneFocus will be called for the scene at the front of the
suite.  If requestSceneFocus fails, the pop will fail.
     *
     * @param suiteId The Id of the group the application that owns the scene
belongs to.
     *
     * @return True in all cases unless the pop causes the scene to go to the
top of all other scenes.  In that case requestSceneFocus is called and the
result of that call is returned.
     *
     * @throws SecurityException specific to the implementation type (e.g.,
MHP, OCAP, ACAP).
     * @throws IllegalArgumentException if suiteId is not already assigned.
     */
    public boolean popSuiteToScreenFront(int suiteId)
                                                throws SecurityException,
IllegalArgumentException;
```

```
    /**
     * Pushes a suite to the rear of all applications visible or hidden in
the screen visibility stack.
     *
     * @param suiteId The Id of the suite the application that owns the scene
belongs to.
     *
     * @throws SecurityException specific to the implementation type (e.g.,
MHP, OCAP, ACAP).
     * @throws IllegalArgumentException if suiteId is not already assigned.
     */
    public void pushSuiteToScreenRear(HScene scene, int suiteId)
                                                throws SecurityException,
IllegalArgumentException;

/**
     * Sets the visibility of a scene.  Either hides or un-hides.  Affects
all components associated with the scene.
     *
     * @param scene The scene to hide or un-hide.
     * @param visible True to un-hide if hidden, or False to hide if visible.
     *
     * @throws SecurityException specific to the implementation type (e.g.,
MHP, OCAP, ACAP).
     */
    public void setVisibility(HScene scene, boolean visible) throws
SecurityException;

/**
     * Iconfies an HScene.  The Icon to display is associated with the
application during network specific (e.g., OCAP, MHP, ACAP) signaling of the
application.  All of the visible components of the scene are substituted with
the icon.  It is implementation specific as to where the icon is displayed.
     *
     * @param scene The scene to iconify.
     *
     * @throws SecurityException specific to the implementation type (e.g.,
MHP, OCAP, ACAP).
     */
    public void iconify(HScene scene) throws SecurityException;
}
```

APPENDIX V - SystemSceneTemplate
© Copyright 2003-2004 Time Warner Cable, Inc. All rights reserved.

```java
import org.havi.ui.HScene;
import org.havi.ui.HSceneTemplate;
import org.davic.resources.ResourceClient;

/**
 * The SystemSceneTemplate is used to demonstrate how the patent concepts can
be implemented with HAVi.  A standard incorporating HAVi would mandate that
org.havi.ui.HSceneTemplate implement this interface.
 */
public interface SystemSceneTemplate
{
    /**
     * Use java.awt.Point & Dimension for screen area reservation.
     */
    public final int AREA_PIXEL_LOCATION = 0;

/**
     * Use org.havi.ui.HScreenPoint & HScreenDimension for screen area
reservation.
     */
    public final int AREA_SCREEN_LOCATION = 1;

/**
     * Cannot be overlapped by any application;
     */
    public final int PRIORITY_GLOBAL = 0x00000001;

/**
     * Can be overlapped by applications in the same service or group.
     */
    public final int PRIORITY_GROUP = 0x00000002;

/**
     * Can be overlapped by applications with higher application priority.
     */
    public final int PRIORITY_APPLICATION = 0x00000004;

/**
     * Reserves an area of the screen for an application's HScene.  This
reservation prevents other components from overlaying it, including
components in other applications unless permitted by the application as
described by the priority parameter definition of this method.

* @param scene Scene belonging to the application wishing to reserve the
screen portion.
     * @param preference If AREA_PIXEL_LOCATION, then use java.awt.Point &
Dimension, else if
     *      AREA_SCREEN_LOCATION use org.havi.ui.HSreenPoint &
HScreenDimension for location and
     *      dimension parameters.
     * @param location Location of the area to be reserved.
     * @param dimension Dimension of the area to be reserved.
```

```
     * @param priority If PRIORITY_GLOBAL the area cannot be overlapped by
any component in any application.  This priority is very constraining and
should be used with caution.
     *       If PRIORITY_GROUP the area can be overlapped by components
belonging to applications within the same service or group.  The notion of
applications within a service is defined by standards such as OCAP, ACAP, and
MHP.  The notion of applications within a group is defined by this
disclosure.  If PRIORITY_APPLICATION the area can be overlapped by components
belonging to applications with higher priority than the calling application.
The notion of application priority is also defined by the aforementioned
standards.  These priorities can be bitwise ORed together.  In that case the
rules of each included priority are followed by the implementation.
     * @param resourceClient DAVIC framework resource client used for shared
resource management.  Defined by the aforementioned standards.
     *
     * @throws IllegalArgumentException if location and dimension do not
describe an area within the scene.
     * @throws IllegalArgumentException if scene or preference are null, or
do not point to valid objects owned by the calling application.
     * @throws IllegalArgumentException if preference isn't one of
AREA_PIXEL_LOCATION, or
     *       AREA_SCREEN_LOCATION.
     * @throws IllegalArgumentException if priority isn't any inclusive of
PRIORITY_GLOBAL,
     *       PRIORITY_GROUP, or PRIORITY_APPLICATION.
     */
    public void reserveScreenArea(HScene scene, int preference,
                                  Object location, Object dimension,
                                  int priority, ResourceClient
resourceClient)
                                        throws
IllegalArgumentException;
}
```

What is claimed is:

1. Consumer electronic apparatus configured for communication with a network that distributes content, the consumer electronic apparatus comprising:
   processing apparatus;
   computer-readable storage apparatus in data communication with the processing apparatus and having a plurality of computer program applications and a privileged application stored thereon, each of the plurality of computer program applications operative to be executed by the processing apparatus; and
   a display element manager process in data communication with the privileged application and configured to manage display of a plurality of display elements,
   wherein the display element manager process is configured to:
      control overlap of two or more display elements associated with respective ones of the plurality of computer program applications;
      provide for control of a first one of the two or more display elements by at least the privileged application;
      monitor display resources within the consumer electronic apparatus, the monitor of the display resources comprising a determination of a value corresponding to a portion of the display resources used by the consumer electronic apparatus; and
      dynamically allocate the display resources between the two or more display elements based on the monitoring, the dynamic allocation configured to enable the overlap of the two or more display elements by an amount proportional to the value.

2. The consumer electronic apparatus of claim 1, wherein the plurality of computer program applications further comprise a plurality of unbound applications, and said control of the overlap of two or more display elements associated with the respective ones of the plurality of computer program applications comprises control of the overlap between at least one bound and at least one unbound application.

3. The consumer electronic apparatus of claim 2, wherein when said at least one bound application is hidden, at least one bound component of the at least one bound application is also hidden.

4. The consumer electronic apparatus of claim 1, wherein said display element manager further comprises a window manager that is configured to maintain and update at least one visibility stack such that an in-focus application is maintained at a top of said at least one visibility stack.

5. The consumer electronic apparatus of claim 4, wherein said in-focus application can be selected by a user via a remote control and a user-interactive component.

6. The consumer electronic apparatus of claim 4, wherein said in-focus application can be selected by said privileged application.

7. The consumer electronic apparatus of claim 1, wherein said control of said first one of the two or more display elements by the privileged application requires one or more appropriate permissions.

8. The consumer electronic apparatus of claim 1, wherein the plurality of computer program applications, when executed by the processing apparatus, are further configured to:
   cause the consumer electronic apparatus to obtain instructions provided via a remote control, wherein the instructions comprise an instruction to "push" media to another consumer electronic apparatus.

9. The consumer electronic apparatus of claim 1, wherein the plurality of computer program applications, when executed by the processing apparatus, are further configured to:
   cause the consumer electronic apparatus to obtain instructions provided via a remote control, wherein the instructions comprise an instruction to "pull" media from another consumer electronic apparatus.

10. A computerized method of operating a computerized user device configured to run a plurality of applications, and to communicate with a remote node, the computerized method comprising:
   receiving at said computerized user device a signal from said remote node, said signal comprising a signal for configuring a privileged application of said plurality of applications;
   configuring two or more display elements associated with respective two or more of said plurality of applications based at least in part on said signal, said configuring including selecting at least one in-focus application;
   determining an association between the respective ones of said plurality of applications, the determining of the association based on a capability of one or more of said respective two or more of said plurality of applications to invoke another one or more of said respective ones of said plurality of applications;
   based at least on the association, aggregating locations of information relating to the two or more display elements within a visibility management component resident on said computerized user device; and
   based on a selection by said privileged application of at least one other one of said plurality of applications to be in-focus within said computerized user device, altering a location of information relating to said at least one other one of said plurality of applications within the visibility management component so as to implement at least a portion of a priority scheme within said computerized user device.

11. The computerized method of claim 10, wherein said visibility management component comprises a plurality of different window displays.

12. The computerized method of claim 11, wherein said plurality of different window displays are characterized by different sizes.

13. The computerized method of claim 11, wherein said plurality of different window displays are characterized by different levels of overlap within said visibility management component.

14. The computerized method of claim 10, further comprising altering, based at least on said remote node accessing said visibility management component, the location of information relating to said plurality of application programs within said visibility management component resident on said computerized user device.

15. The computer electronic apparatus of claim 1, wherein the dynamic allocation of the display resources comprises enablement or disablement of an exclusive reservation of resources for one or more of the respective ones of the plurality of computer program applications.

16. The computerized method of claim 10, further comprising:
   based at least on the selection, prioritizing a display element associated with said at least one other one of said plurality of applications, such that the display element associated with said at least one other of said plurality of applications remains on top of all display elements associated with all the others of the respective ones of said plurality of applications.

17. The computerized method of claim 10, wherein the visibility management component comprises a visibility stack; and
    wherein the altering the location of information relating to said one at least one other of said plurality of applications comprises moving the location of information relating to said one at least one other of said plurality of applications to a top of the visibility stack while keeping the location of information relating to said one at least one other of said plurality of applications within the visibility management component.

18. The computerized method of claim 10, wherein the determining the association between the two or more display elements comprises determining the association based on one or more common attributes of the two or more display elements.

19. Computer readable apparatus comprising a non-transitory storage medium, the non-transitory storage medium comprising at least one computer program having a plurality of instructions, the plurality of instructions configured to, when executed on a processing apparatus:
    control overlap of two or more display elements associated with respective ones of the plurality of computer program applications of a computerized client device;
    monitor display resources within the computerized client device,
    based on the monitoring, determine whether an amount of the display resources available meet a prescribed criterion; and
    dynamically allocate the display resources between the two or more display elements based at least on the monitoring;
    wherein the dynamic allocation is configured to:
        enable the overlap of the two or more display elements based on a determination that the amount of the display resources available does not meet the prescribed criterion; and
        disable the overlap of the two or more display elements based on (i) a determination that the amount of the display resources available meets or exceeds the prescribed criterion, and (ii) one or more second criterion are not met.

20. The computer readable apparatus of claim 19, wherein:
    the prescribed criterion comprises a prescribed threshold value; and
    the one or more second criterion comprise at least one of the two or more display elements being associated with a time-sensitive alert, such that the at least one of the two or more display elements associated with the time-sensitive alert is overlaid on top of all other ones of the two or more display elements.

21. The computer readable apparatus of claim 19, wherein the one or more second criterion comprise at least two of the two or more display elements sharing a common attribute, such that the overlap comprises only the at least two of the two or more display elements being allowed to overlap with each other.

\* \* \* \* \*